United States Patent
Gujarathi et al.

(10) Patent No.: US 9,244,700 B2
(45) Date of Patent: Jan. 26, 2016

(54) METHODS AND SYSTEMS FOR DELIVERING APPLICATIONS FROM A DESKTOP OPERATING SYSTEM

(75) Inventors: Ashish Gujarathi, Coral Springs, FL (US); Thierry Duchastel, Fort Lauderdale, FL (US); Xiaodong Huang, Oakland Park, FL (US); Tom Kludy, Plantation, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 436 days.

(21) Appl. No.: 13/102,301

(22) Filed: May 6, 2011

(65) Prior Publication Data

US 2011/0276661 A1 Nov. 10, 2011

Related U.S. Application Data

(60) Provisional application No. 61/332,805, filed on May 9, 2010.

(51) Int. Cl.
*G06F 15/16* (2006.01)
*G06F 9/44* (2006.01)
*G06F 9/455* (2006.01)

(52) U.S. Cl.
CPC .......... *G06F 9/4445* (2013.01); *G06F 9/45533* (2013.01)

(58) Field of Classification Search
CPC .... H04L 67/02; G06F 9/4445; G06F 9/45533
USPC ......................................................... 709/219
See application file for complete search history.

(56) References Cited

U.S. PATENT DOCUMENTS

| 2002/0103882 | A1* | 8/2002 | Johnston et al. | 709/218 |
|---|---|---|---|---|
| 2002/0103884 | A1* | 8/2002 | Duursma et al. | 709/219 |
| 2007/0198656 | A1* | 8/2007 | Mazzaferri et al. | 709/218 |
| 2010/0050077 | A1* | 2/2010 | Ryman | 715/704 |
| 2012/0158832 | A1* | 6/2012 | Kim | 709/203 |

* cited by examiner

*Primary Examiner* — June Sison
*Assistant Examiner* — Steven Nguyen
(74) *Attorney, Agent, or Firm* — Foley & Lardner LLP; John D. Lanza

(57) ABSTRACT

The present invention is directed towards methods and systems for delivering applications from a desktop operating system. A delivery module may receive a request from a client device of a user for access to an application, and identify that a desktop session can host the requested application. An agent may extract presentation layer elements of the requested application from presentation layer elements of other components of the desktop session, and provide, via a presentation layer protocol, the isolated presentation layer elements in a first application session to the client device for display. The delivery module may receive a second request from the user for the application, identify that the application is hosted by the desktop session and delivered in the first application session, and provide a second application session of the application from the desktop session to the user responsive to the determination.

18 Claims, 13 Drawing Sheets

METHODS AND SYSTEMS FOR DELIVERING APPLICATIONS FROM A DESKTOP OPERATING SYSTEM

RELATED APPLICATION

This present application claims the benefit of and priority to U.S. Provisional Patent Application No. 61/332,805, entitled "METHODS AND SYSTEMS FOR DELIVERING APPLICATIONS FROM A DESKTOP OPERATING SYSTEM," filed May 9, 2010, which is incorporated by reference in its entirety.

FIELD OF THE DISCLOSURE

The methods and systems described herein relate generally to remotely providing applications. In particular, the methods and systems relate to remotely providing an application from a desktop operating system.

BACKGROUND OF THE DISCLOSURE

Typically, remote application systems deliver seamless applications from a terminal server OS platform. There exists a number of applications that do not work or are not supported on a terminal server platform, and it may not be possible to remote certain devices, e.g. USB, on the terminal server platform. Delivery of desktop environments to a user may provide more functionality to a user, including access to more types of applications. Desktop delivery to a client device, however, may consume more bandwidth as well as resources on the client device as compared to application delivery using terminal services.

SUMMARY OF THE DISCLOSURE

In some aspects, described herein are methods and systems for delivering an application, the application delivered from a desktop operating system (OS) or a desktop session executing on a server. In various embodiments, the methods and systems described herein may centrally configure one or more applications, and may deliver these applications from a pool of physical or virtual machines (VMs) executing a desktop OS or session. A delivery module may redirect data from a client device as input to an application that is hosted on a desktop OS. The delivery module may deliver or provide icons representing desktop-OS-hosted applications to a client device. The delivery module can monitor and control application sessions providing access to such applications, and may further support session-sharing, reconnection and smooth-roaming of desktop-OS-hosted applications. The delivery module can provide support for powering on VMs as needed when an application is requested. In some embodiments, the delivery module can deliver applications hosted on a desktop session to a user, and further assign the desktop session to the user. Accordingly, the user can be routed to the same desktop session when the user requests for or launches another application.

In one aspect, the disclosure is related to a method for delivering an application to a computing device. The application may be delivered from a desktop session that can host at least one application and executes on a server. A delivery module executing on a computing device may receive a request from a client device of a first user for access to an application. The delivery module may identify a first desktop session executing on a server. The identified desktop session may host a plurality of components including the requested application. An agent executing on the server may extract presentation layer elements of the requested application from presentation layer elements of other components of the first desktop session. The agent may provide, via a presentation layer protocol, the isolated presentation layer elements in a first application session to the client device for display. The delivery module may receive a second request from the first user for the application. The delivery module may identify that the application is hosted by the first desktop session and delivered in the first application session. The delivery module may provide a second application session of the application from the first desktop session to the first user responsive to the determination.

In some embodiments, the delivery module may indicate, to the client device, a plurality of applications available for request and hosted by a plurality of desktop sessions. The delivery module may identify, from the request, the application based on file type association (FTA) with a file residing on the client device. The first desktop session may be designated for delivering applications to a user instead of delivering a desktop. The delivery module may assign the first desktop session as a desktop session dedicated to the first user.

The delivery module may provide the second application session of the application to the first user responsive to a determination that the first application session is disconnected from the user, the second application session comprising the first application session reconnected with the user. In some embodiments, the delivery module may provide the second application session of the application to the first user responsive to a determination that the first application session remains active, the second application session delivered via a same presentation layer connection as the first application session. The delivery module may provide the second application session of the application, the second application session incorporating an application update introduced in the first application session. In some embodiments, the delivery module may receive a third request from the first user for a second application, and provide a third application session from the first desktop session to the first user, the third application session corresponding to the second application. The delivery module may receive a third request from the first user for a second application, and provide a third application session from a second desktop session to the first user, the third application session corresponding to the second application.

In another aspect, the disclosure is related to a system for delivering an application to a computing device, the application delivered from a desktop session hosting at least one application and executing on a server. The system may include a delivery module executing on a computing device. The delivery module may receive a request from a client device of a first user for access to an application, and identify that a first desktop session hosts the requested application. The desktop session may execute on a desktop OS and host a plurality of components. An agent executing on the desktop OS may extract presentation layer elements of the requested application from presentation layer elements of other components of the first desktop session, and provide, via a presentation layer protocol, the isolated presentation layer elements in a first application session to the client device for display. The delivery module may receive a second request from the first user for the application, identify that the application is hosted by the first desktop session and delivered in the first application session, and provide a second application session of the application from the first desktop session to the first user responsive to the determination.

In some embodiments, the delivery module indicates to the client device a plurality of applications available for request and hosted by a plurality of desktop sessions (in other words on different computing devices, since each desktop OS can only host one desktop session). The delivery module may identify the application based on file type association (FTA) with a file residing on the client device, the file identified in the request. The delivery module may select the first desktop session as one designated for delivering applications to a user instead of a desktop session. The delivery module may assign the first desktop session as a dedicated desktop session for first user.

In some embodiments, the delivery module provides the second application session of the application to the first user responsive to a determination that the first application session is disconnected from the user, the second application session comprising the first application session reconnected with the user. The delivery module may provide the second application session of the application to the first user responsive to a determination that the first application session remains active, the second application session delivered via a same presentation layer connection as the first application session.

In some embodiments, the second application session incorporates an application update introduced in the first application session. The delivery module may receive a third request from the first user for a second application, and provides a third application session from the first desktop session to the first user, the third application session corresponding to the second application. The delivery module may receive a third request from the first user for a second application, and provide a third application session from a second desktop session to the first user, the third application session corresponding to the second application.

BRIEF DESCRIPTION OF THE DRAWINGS

The following figures depict certain illustrative embodiments of the methods and systems described herein, where like reference numerals refer to like elements. Each depicted embodiment is illustrative of these methods and systems and not limiting.

DETAILED DESCRIPTION OF THE DRAWINGS

Figure 1A:
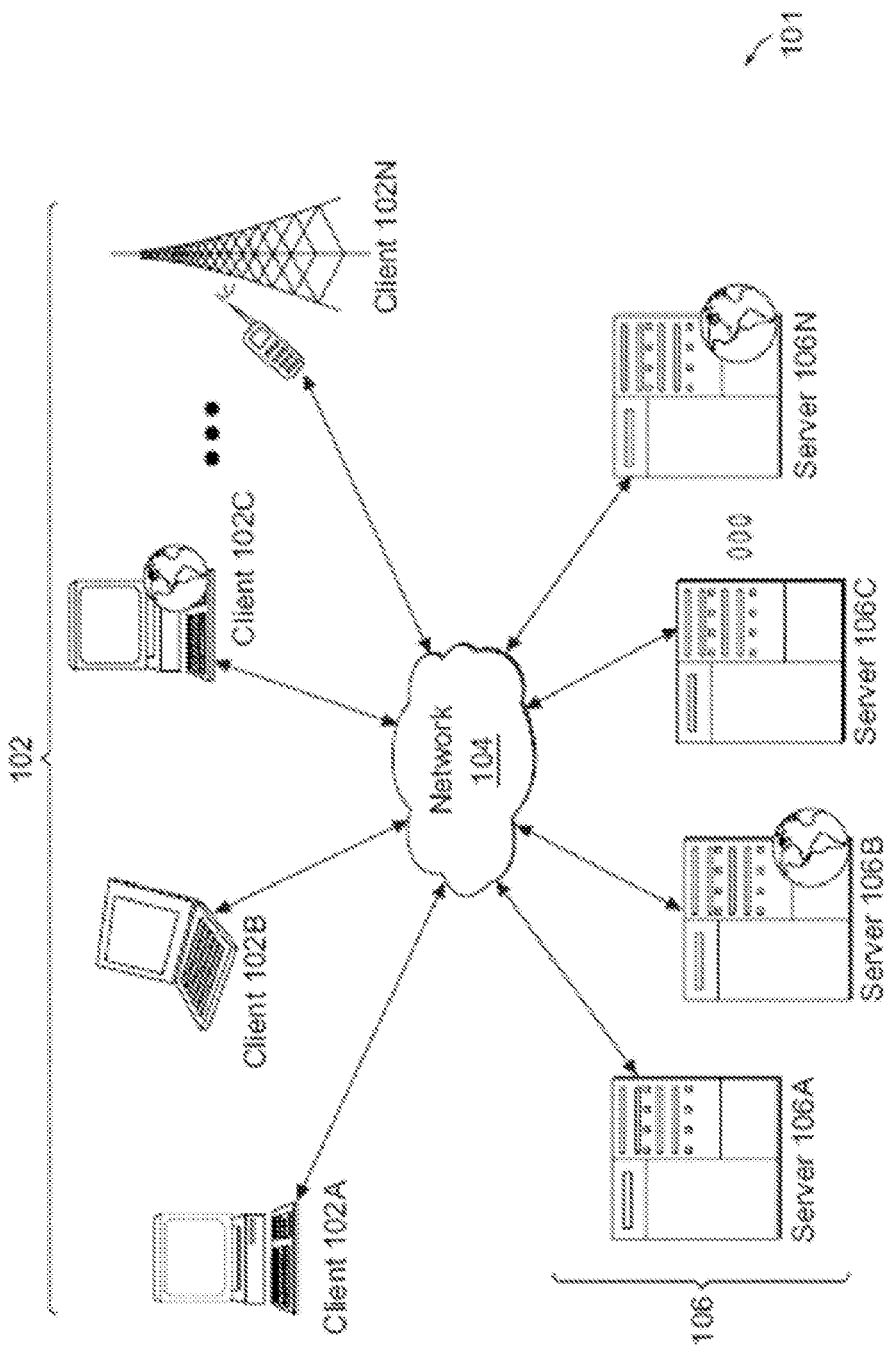
FIG. 1A is a block diagram illustrative of an embodiment of a remote-access, networked environment with a client machine that communicates with a server.

FIG. 1A illustrates one embodiment of a computing environment 101 that includes one or more client machines 102A-102N (generally referred to herein as "client machine(s) 102") in communication with one or more servers 106A-106N (generally referred to herein as "server(s) 106"). Installed in between the client machine(s) 102 and server(s) 106 is a network.

In one embodiment, the computing environment 101 can include an appliance installed between the server(s) 106 and client machine(s) 102. This appliance can mange client/server connections, and in some cases can load balance client connections amongst a plurality of backend servers.

The client machine(s) 102 can in some embodiment be referred to as a single client machine 102 or a single group of client machines 102, while server(s) 106 may be referred to as a single server 106 or a single group of servers 106. In one embodiment a single client machine 102 communicates with more than one server 106, while in another embodiment a single server 106 communicates with more than one client machine 102. In yet another embodiment, a single client machine 102 communicates with a single server 106.

A client machine 102 can, in some embodiments, be referenced by any one of the following terms: client machine(s) 102; client(s); client computer(s); client device(s); client computing device(s); local machine; remote machine; client node(s); endpoint(s); endpoint node(s); or a second machine. The server 106, in some embodiments, may be referenced by any one of the following terms: server(s), local machine; remote machine; server farm(s), host computing device(s), or a first machine(s).

In one embodiment, the client machine 102 can be a virtual machine 102C. The virtual machine 102C can be any virtual machine, while in some embodiments the virtual machine 102C can be any virtual machine managed by a hypervisor developed by XenSolutions, Citrix Systems, IBM, VMware, or any other hypervisor. In other embodiments, the virtual machine 102C can be managed by any hypervisor, while in still other embodiments, the virtual machine 102C can be managed by a hypervisor executing on a server 106 or a hypervisor executing on a client 102.

The client machine 102 can in some embodiments execute, operate or otherwise provide an application that can be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions. Still other embodiments include a client device 102 that displays application output generated by an application remotely executing on a server 106 or other remotely located machine. In these embodiments, the client device 102 can display the application output in an application window, a browser, or other output window. In one embodiment, the application is a desktop, while in other embodiments the application is an application that generates a desktop.

The server 106, in some embodiments, executes a remote presentation client or other client or program that uses a thin-client or remote-display protocol to capture display output generated by an application executing on a server 106 and transmits the application display output to a remote client 102. The thin-client or remote-display protocol can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

The computing environment 101 can include more than one server 106A-106N such that the servers 106A-106N are logically grouped together into a server farm 106. The server farm 106 can include servers 106 that are geographically dispersed and logically grouped together in a server farm 106, or servers 106 that are located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity, while in other embodiments the server farm 106 can include multiple server farms 106.

In some embodiments, a server farm 106 can include servers 106 that execute a substantially similar type of operating system platform (e.g., WINDOWS NT, manufactured by Microsoft Corp. of Redmond, Wash., UNIX, LINUX, or SNOW LEOPARD.) In other embodiments, the server farm 106 can include a first group of servers 106 that execute a first type of operating system platform, and a second group of servers 106 that execute a second type of operating system platform. The server farm 106, in other embodiments, can include servers 106 that execute different types of operating system platforms.

The server 106, in some embodiments, can be any server type. In other embodiments, the server 106 can be any of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 executing an active directory; or a server 106 executing an application acceleration program that provides firewall functionality, application functionality, or load balancing functionality. In some embodiments, a server 106 may be a RADIUS server that includes a remote authentication dial-in user service. In embodiments where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a first server 106A that receives requests from a client machine 102, forwards the request to a second server 106B, and responds to the request generated by the client machine 102 with a response from the second server 106B. The first server 106A can acquire an enumeration of applications available to the client machine 102 and well as address information associated with an application server 106 hosting an application identified within the enumeration of applications. The first server 106A can then present a response to the client's request using a web interface, and communicate directly with the client 102 to provide the client 102 with access to an identified application.

The server 106 can, in some embodiments, execute any one of the following applications: a thin-client application using a thin-client protocol to transmit application display data to a client; a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 that is an application server such as: an email server that provides email services such as MICROSOFT EXCHANGE manufactured by the Microsoft Corporation; a web or Internet server; a desktop sharing server; a collaboration server; or any other type of application server. Still other embodiments include a server 106 that executes any one of the following types of hosted server applications: GOTOMEETING provided by Citrix Online Division, Inc.; WEBEX provided by WebEx, Inc. of Santa Clara, Calif.; or Microsoft Office LIVE MEETING provided by Microsoft Corporation.

Client machines 102 can, in some embodiments, be a client node that seeks access to resources provided by a server 106. In other embodiments, the server 106 may provide clients 102 or client nodes with access to hosted resources. The server 106, in some embodiments, functions as a master node such that it communicates with one or more clients 102 or servers 106. In some embodiments, the master node can identify and provide address information associated with a server 106 hosting a requested application, to one or more clients 102 or servers 106. In still other embodiments, the master node can be a server farm 106, a client 102, a cluster of client nodes 102, or an appliance.

One or more clients 102 and/or one or more servers 106 can transmit data over a network 104 installed between machines and appliances within the computing environment 101. The network 104 can comprise one or more sub-networks, and can be installed between any combination of the clients 102, servers 106, computing machines and appliances included within the computing environment 101. In some embodiments, the network 104 can be: a local-area network (LAN); a metropolitan area network (MAN); a wide area network (WAN); a primary network 104 comprised of multiple sub-networks 104 located between the client machines 102 and the servers 106; a primary public network 104 with a private sub-network 104; a primary private network 104 with a public sub-network 104; or a primary private network 104 with a private sub-network 104. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; or a network 104 that includes a wireless link where the wireless link can be an infrared channel or satellite band. The network topology of the network 104 can differ within different embodiments, possible network topologies include: a bus network topology; a star network topology; a ring network topology; a repeater-based network topology; or a tiered-star network topology. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices.

Figure 1B:
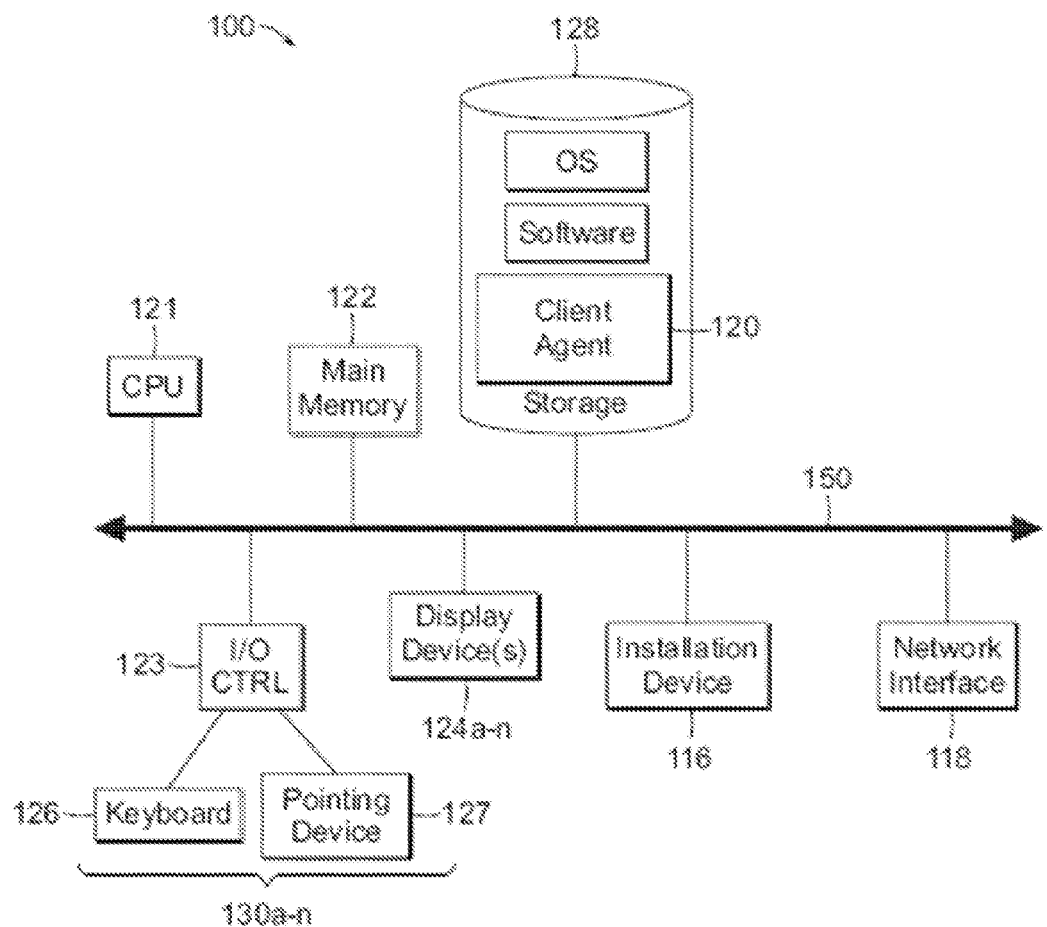
FIGS. 1B and 1C are block diagrams illustrative of an embodiment of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
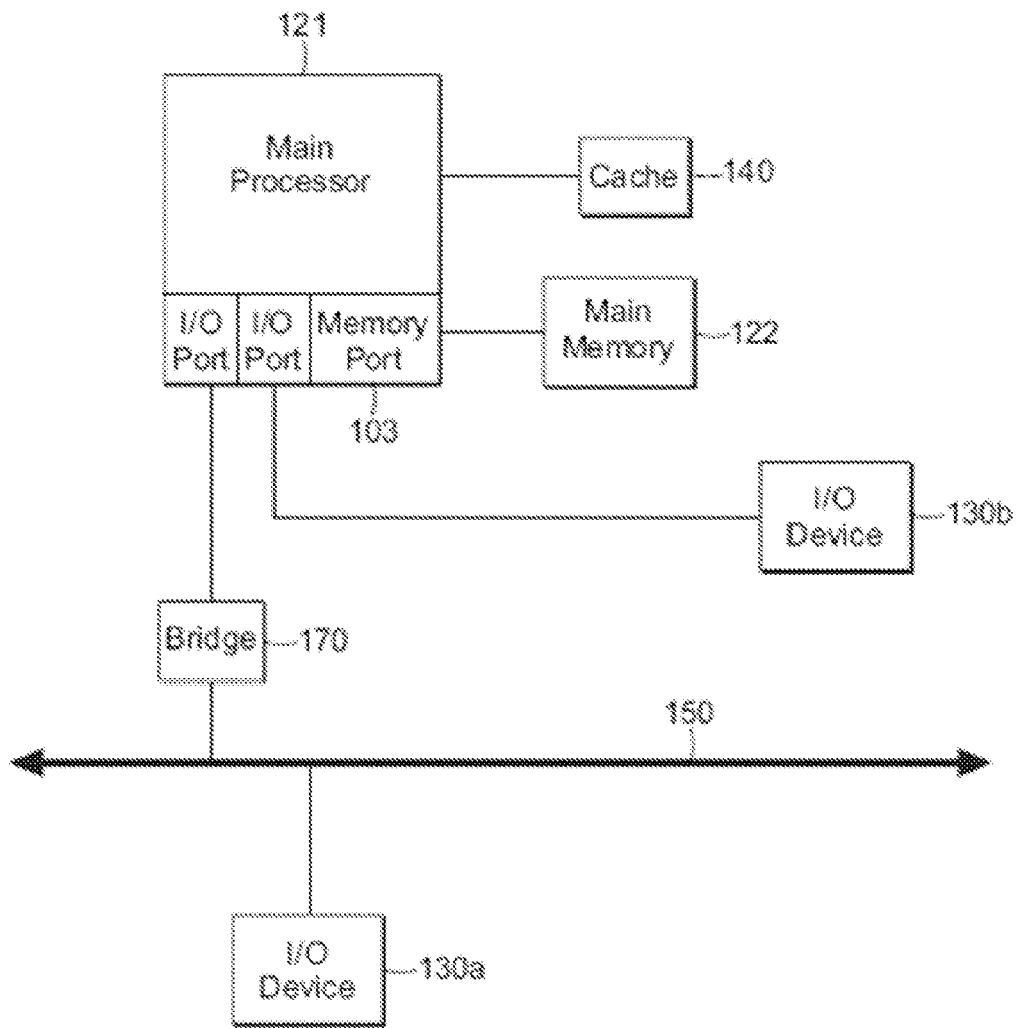

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the main central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits. Still other embodiments of the central processing unit 122 may include any combination of the following: a microprocessor, a microcontroller, a central processing unit with a single processing core, a central processing unit with two processing cores, or a central processing unit with more than one processing core.

While FIG. 1C illustrates a computing device 100 that includes a single central processing unit 121, in some embodiments the computing device 100 can include one or more processing units 121. In these embodiments, the computing device 100 may store and execute firmware or other executable instructions that, when executed, direct the one or more processing units 121 to simultaneously execute instructions or to simultaneously execute instructions on a single piece of data. In other embodiments, the computing device 100 may store and execute firmware or other executable instructions that, when executed, direct the one or more processing units to each execute a section of a group of instructions. For example, each processing unit 121 may be instructed to execute a portion of a program or a particular module within a program.

In some embodiments, the processing unit 121 can include one or more processing cores. For example, the processing unit 121 may have two cores, four cores, eight cores, etc. In one embodiment, the processing unit 121 may comprise one or more parallel processing cores. The processing cores of the processing unit 121 may in some embodiments access available memory as a global address space, or in other embodiments, memory within the computing device 100 can be segmented and assigned to a particular core within the processing unit 121. In one embodiment, the one or more processing cores or processors in the computing device 100 can each access local memory. In still another embodiment, memory within the computing device 100 can be shared amongst one or more processors or processing cores, while other memory can be accessed by particular processors or subsets of processors. In embodiments where the computing device 100 includes more than one processing unit, the multiple processing units can be included in a single integrated circuit (IC). These multiple processors, in some embodiments, can be linked together by an internal high speed bus, which may be referred to as an element interconnect bus.

In embodiments where the computing device 100 includes one or more processing units 121, or a processing unit 121 including one or more processing cores, the processors can execute a single instruction simultaneously on multiple pieces of data (SIMD), or in other embodiments can execute multiple instructions simultaneously on multiple pieces of data (MIMD). In some embodiments, the computing device 100 can include any number of SIMD and MIMD processors.

The computing device 100, in some embodiments, can include a graphics processor or a graphics processing unit (Not Shown). The graphics processing unit can include any combination of software and hardware, and can further input graphics data and graphics instructions, render a graphic from the inputted data and instructions, and output the rendered graphic. In some embodiments, the graphics processing unit can be included within the processing unit 121. In other embodiments, the computing device 100 can include one or more processing units 121, where at least one processing unit 121 is dedicated to processing and rendering graphics.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O device 130A-130N. In some embodiments, the local system bus 150 can be any one of the following types of buses: a VESA VL bus; an ISA bus; an EISA bus; a Micro-Channel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121. Still other versions of the computing machine 100 include a processor 121 connected to an I/O device 130A-130N via any one of the following connections: HyperTransport, Rapid I/O, or InfiniBand. Further embodiments of the computing machine 100 include a processor 121 that communicates with one I/O device 130A using a local interconnect bus and a second I/O device 130B using a direct connection.

The computing device 100, in some embodiments, includes a main memory unit 122 and cache memory 140. The cache memory 140 can be any memory type, and in some embodiments can be any one of the following types of memory: SRAM; BSRAM; or EDRAM. Other embodiments include cache memory 140 and a main memory unit 122 that can be any one of the following types of memory: Static random access memory (SRAM), Burst SRAM or Synch-Burst SRAM (BSRAM); Dynamic random access memory (DRAM); Fast Page Mode DRAM (FPM DRAM); Enhanced DRAM (EDRAM), Extended Data Output RAM (EDO RAM); Extended Data Output DRAM (EDO DRAM); Burst Extended Data Output DRAM (BEDO DRAM); Enhanced DRAM (EDRAM); synchronous DRAM (SDRAM); JEDEC SRAM; PC100 SDRAM; Double Data Rate SDRAM (DDR SDRAM); Enhanced SDRAM (ESDRAM); SyncLink DRAM (SLDRAM); Direct Rambus DRAM (DRDRAM); Ferroelectric RAM (FRAM); or any other type of memory. Further embodiments include a central processing unit 121 that can access the main memory 122 via: a system bus 150; a memory port 103; or any other connection, bus or port that allows the processor 121 to access memory 122.

One embodiment of the computing device 100 provides support for any one of the following installation devices 116: a CD-ROM drive, a CD-R/RW drive, a DVD-ROM drive, tape drives of various formats, USB device, a bootable medium, a bootable CD, a bootable CD for GNU/Linux distribution such as KNOPPIX®, a hard-drive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

The computing device 100 may further include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments include an I/O device 130 that may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a FibreChannel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124A-124N. The computing device 100 may in some embodiments be configured to use one or multiple display devices 124A-124N, these configurations include: having multiple connectors to interface to multiple display devices 124A-124N; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments, the computing machine 100 can execute any operating system, while in other embodiments the computing machine 100 can execute any of the following operating systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system. In still another embodiment, the computing machine 100 can execute multiple operating systems. For example, the computing machine 100 can execute PARALLELS or another virtualization platform that can execute or manage a virtual machine executing a first operating system, while the computing machine 100 executes a second operating system different from the first operating system.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a netbook; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95c1, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. In still other embodiments, the computing device 100 can be any one of the following mobile computing devices: any one series of Blackberry, or other handheld device manufactured by Research In Motion Limited; the iPhone manufactured by Apple Computer; Palm Pre; a Pocket PC; a Pocket PC Phone; or any other handheld mobile device.

Figure 2A:
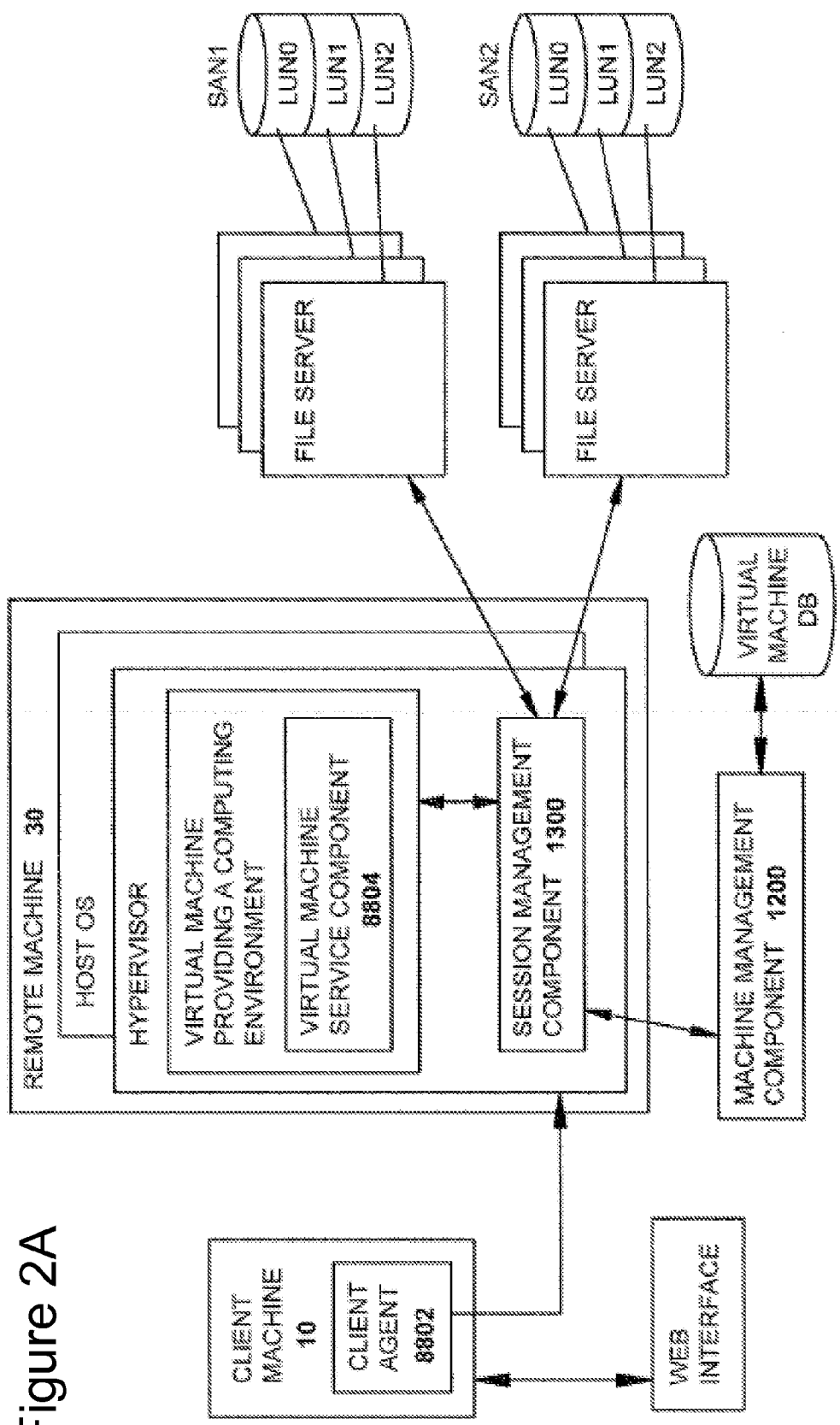
FIGS. 2A and 2B are block diagrams illustrative of embodiments of a system for providing or delivering a resource to a client device.
Figure 2B:
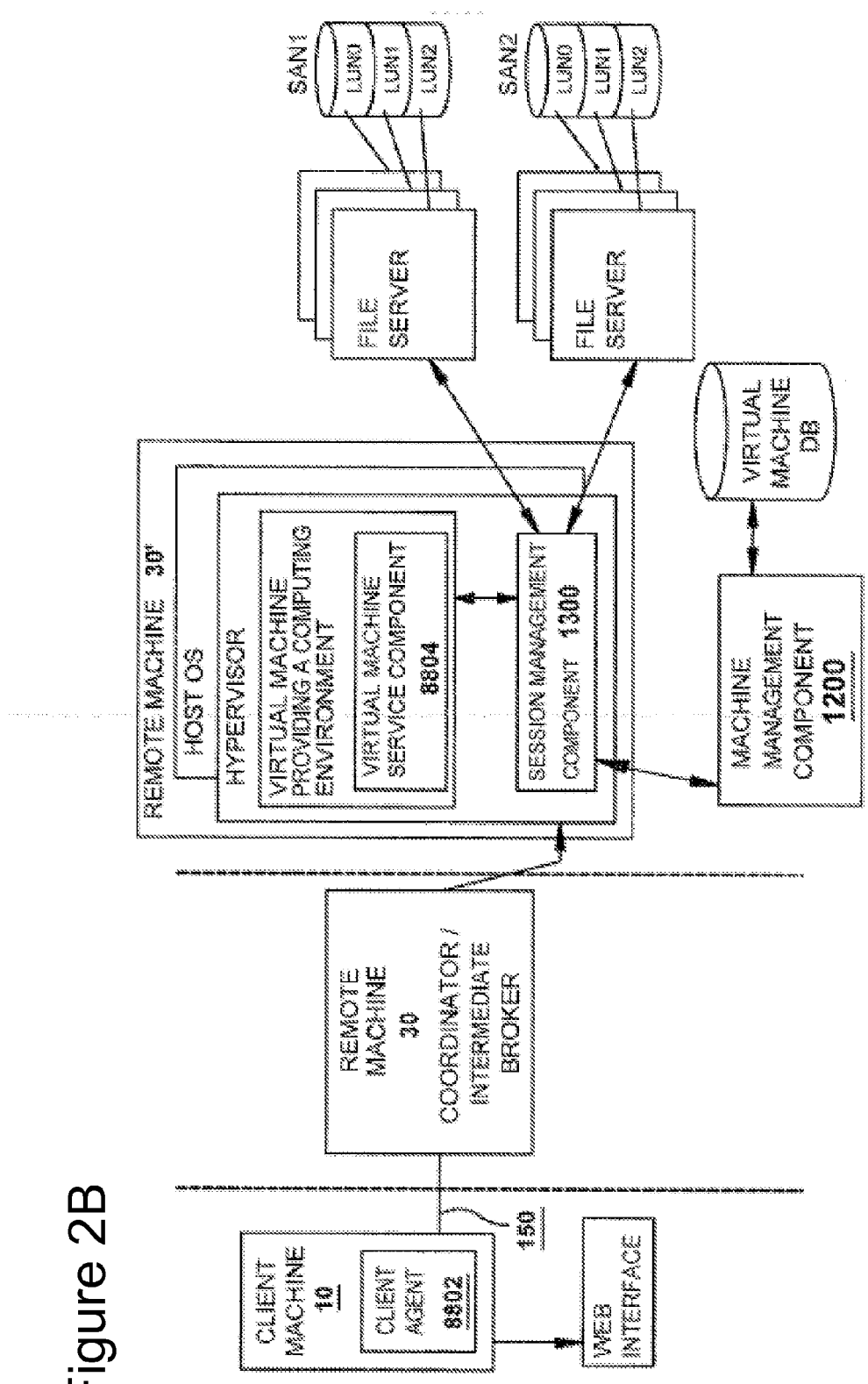

Referring now to FIG. 2A, a block diagram depicts one particular embodiment of a system for providing, by a virtual machine access to a computer environment. The computer environment may include an application or a desktop, for example. A client agent 8802 on a client machine 102 connects to a remote machine 30. In some embodiments, the client agent 8802 establishes a connection with a session management component 1300. In other embodiments, the session management component 1300 is executed by the remote machine 30 to which the client machine 10 connects. In one embodiment, the session management component 1300 queries a virtual machine management component 1200, for the location of the configuration and virtual disk files of a virtual machine to run for the current user and a hypervisor in which the virtual machine may execute. In some embodiments, the identified hypervisor and virtual machine execute on remote machine 30. In other embodiments, for example as depicted in FIG. 2B, the identified hypervisor and virtual machine may execute on a remote machine 30'. In one embodiment, the session management component launches the virtual machine within the specified hypervisor in full screen mode. In another embodiment, a previously-executing virtual machine is allocated to the client machine 10.

In some embodiments, a virtual machine service component 8804 executes within a computing environment provided by a virtual machine on a remote machine 30. In one of these embodiments, the virtual machine service component 8804 receives an IP address and a port with which to establish a communication channel between the session management component 1300 and the virtual machine service component 8804. In one embodiment, this communication channel is used to pass session related configuration information from the client agent session into the virtual machine session. In some embodiments, the configuration information includes display settings and changes, client drive information and authentication data with which to enable single sign-on for a user of the client machine 10.

In some embodiments, once the communications channel is established and the initial session related information is passed to the virtual machine service component 8804, the virtual machine service component 8804 automatically connects the user to a computing environment, such as a guest operating system, using the same credentials as were provided to the client agent 8802 by the user (if any). In one of these embodiments, the virtual machine service component 8804 automatically reconfigures the display settings of the guest operating system to match those of the client 8802. The virtual machine produces graphics and sound output to virtual devices that redirect that output, directly or indirectly, to the client agent 8802 on the client machine 10. The virtual machine receives audio input, mouse and keyboard device data redirected from the client machine 10. When the virtual machine is shutdown or suspended the session management component 1300 terminates the client agent session.

Figure 2C:
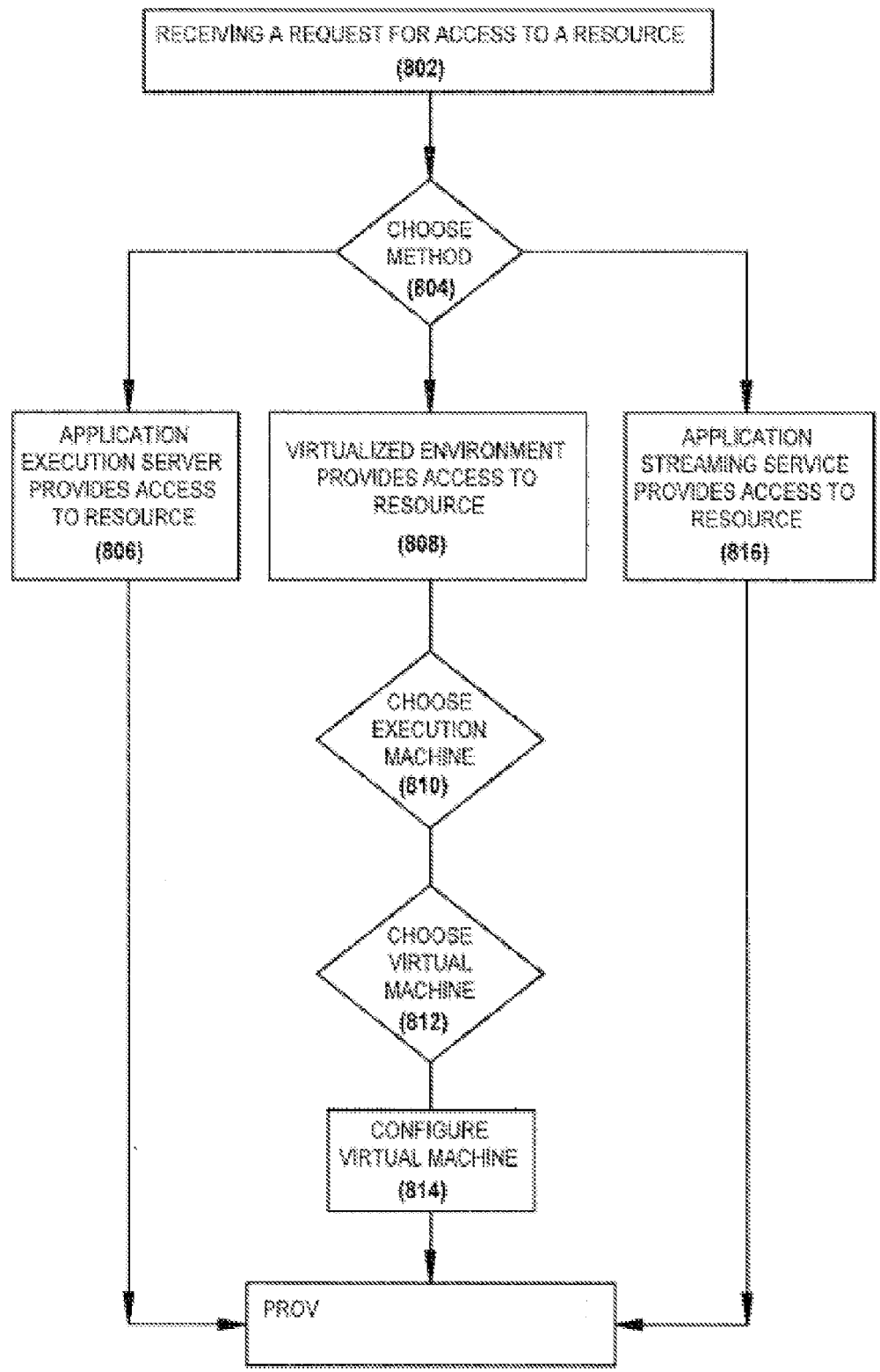
FIG. 2C is a flow diagram illustrative of an embodiment of a method for providing or delivering a resource to a client device.

Referring now to FIG. 2C, a flow diagram depicts one embodiment of the steps taken to provide access to a resource, such as an application or a desktop. In brief overview, a request for access to a resource is received (step 802). A method for providing access to the resource is identified (step 804). An application execution server may be selected to provide access to the resource (step 806). A virtualized environment may be selected to provide access to a resource (step 808). An application streaming service may be selected to provide access to the resource (step 816). If the virtualized environment is selected to provide access to the resource, an execution machine is identified (step 810). A virtual machine is selected (step 812). The virtual machine is configured (step 814). Access to the resource is provided (step 818).

Still referring to FIG. 2C, and in more detail, a request for access to a resource is received (step 802). In one embodiment, a remote machine 30 receives the request. In some embodiments, the remote machine 30 is an intermediate broker server. In other embodiments, the remote machine 30 is a gateway. In still other embodiments, the remote machine 30 is a policy engine. In yet other embodiments, the remote machine 30 is an appliance.

In one embodiment, the remote machine 30 verifies that the user is authorized to access the resource. In still another embodiment, the remote machine 30 receives with the request information verifying authorization for access by the user.

In one embodiment, the remote machine 30 receives a request for an application program. In another embodiment, the remote machine 30 receives a request for access to a file. In yet other embodiments, the remote machine 30 receives a request for access to a computing environment. In some embodiments, the remote machine 30 receives a request for access to a computing environment supported by a plurality of hardware requirements. In some embodiments, a remote machine 30 functioning as deployment system receives a request for access to a resource, such as execution of an application program, from a client machine 10.

A method for providing access to the resource is identified (step 804). In one embodiment, a remote machine 30 consults a database to identify the method for providing access. In another embodiment, a remote machine 30 consults a policy or rules database to identify the method for providing access. In still another embodiment, a remote machine 30 receives from a policy engine an identification of a method to select.

For embodiments in which the resource is an application program, a policy may allow execution of the application program on the client machine 10. In another of these embodiments, a policy may enable the client machine 10 to receive a stream of files comprising the application program. In this embodiment, the stream of files may be stored and executed in an isolation environment on the client. In still another of these embodiments, a policy may allow execution of the application program only on a remote machine, such as an application server, and require the remote machine to transmit application-output data to the client machine 10. In yet another of these embodiments, a policy may allow execution of the application program only in a computing environment hosted on a virtual machine. In either of these cases, a stream of files comprising the application programs may be sent to the remote machine.

For embodiments in which the resource is a computing environment, a policy may allow installation of the computing environment on the client machine 10. In another of these embodiments, a policy may enable the client machine 10 to access a copy of the computing environment executing in a virtual machine on a remote machine 30. In still another of these embodiments, a policy may forbid the user of the client machine 10 to access the requested computing environment and offer an alternative computing environment.

For embodiments in which the resource is a computing environment supported by a plurality of hardware resources, a policy may enable the client machine 10 to access a copy of the computing environment executing in a virtual machine, which in turn executes on a hypervisor providing access to the requested plurality of hardware resources. In still another of these embodiments, a policy may forbid the user of the client machine 10 to access the requested computing environment and offer a computing environment supported by an alternative plurality of hardware resources.

The remote machine 30 may choose to provide access to an application execution server which provides access to a requested application program (step 806). The application execution server executes the application program and transmits application output data to the client machine 10. The application execution server may transmit the application output data over a presentation layer protocol, such as X11, VNC, ICA, or RDP.

Referring back to step 804, the remote machine 30 may choose to provide access to an application streaming service capable of transmitting a requested application program to the client machine 10 (step 816) for execution. Embodiments of application streaming services are described in greater detail below.

Referring back to step 804, the remote machine 30 may choose to respond to the client's request by allowing access to a computing environment provided by a virtual machine, the computing environment providing access to the requested resource (step 808). The computing environment may be provided by a virtual machine launched into a hypervisor executing on a remote machine 30'. In other embodiments, the remote machine 30 determines to provision on the client machine 10 a virtual machine providing access to the computing environment.

In embodiments where a remote machine 30 determines to provide access to the requested resource via a virtualized environment, the remote machine 30 identifies an execution machine providing access to a computing environment requested by the client machine 10 (step 810). In one of these embodiments, the remote machine 30 identifies an execution machine capable of hosting the computing environment. In another of these embodiments, the remote machine 30 determines that the user requesting access to the computing environment lacks authorization to access the requested computing environment. The remote machine 30 may identify an alternative computing environment which the user is authorized to access. In still another of these embodiments, the remote machine 30 identifies an execution machine on which a hypervisor provides access to a requested plurality of hardware and in which the requested computing environment may execute.

In other embodiments, the remote machine 30 is an execution machine capable of hosting the computing environment. In some of these embodiments, the computing environment is installed on the execution machine. In others of these embodiments, a hypervisor on the execution machine emulates a plurality of hardware resources required by the requested computing environment and the computing environment is launched in the hypervisor.

In some embodiments, the remote machine 30 identifies a remote machine 30' functioning as an execution machine capable of providing access to the computing environment supported by a requested plurality of hardware resources. In one of these embodiments, the remote machine 30' functions as an execution machine on which a hypervisor emulating the requested plurality of hardware resources executes and on which a computing environment supported by the hypervisor executes.

In some embodiments, an execution machine providing hardware resources, physical or virtual, capable of supporting a particular virtual machine is identified responsive to a load-balancing determination. In one of these embodiments, the execution machine is selected responsive to load-balancing information maintained by a management server 30. In some embodiments, the management server 30 is a single machine. In still other embodiments, several remote machines 30 may be capable of acting as a management server, but only one of such nodes is designated the management server. In some embodiments, a client request is directed to the management server 30 in the first instance. In other embodiments, a remote machine 30 queries the management server 30 to determine the identity of a suitable execution machine.

In some aspects, the methods and systems described herein can be used to deliver an application from a desktop operating system (OS) executing on a server. A desktop OS may be referred to as a desktop session. A desktop OS may be referred to as a single-user OS. A desktop OS may support a single user session at a time. At most one user may have access to the desktop OS (e.g., a desktop provided by the desktop OS) at any single time. Different users may have access to a desktop session at different points in time. A desktop OS may provide a desktop environment, sometimes referred to as a desktop. A desktop may comprise a workspace or environment that includes at least one application and/or a file. A desktop may be established or configured for a user and/or a specific application environment. A desktop may be established or configured to provide access to applications, operating system features, tools and/or files to support a particular user's role or work context. A visual representation of a desktop, such as a WINDOWS desktop, may include one or more icons each representing a file or an application, and may include elements such as a menu system and a system tray. A desktop may be considered part of an operating system, or an application platform provided by the operating system.

A computing device, such as a server 106 or appliance, may execute a desktop OS. In some embodiments, a desktop OS may include operating systems such as MAC OS or WINDOWS OS. In certain embodiments, desktop operating systems are operating systems designed and/or configured to provide or deliver a desktop or desktop session to a user. A computing device may execute or host a desktop OS, and deliver a desktop to a client device. In certain embodiments, desktop operating systems are operating systems designed and/or configured to provide remote delivery of a desktop from a host to a client device. A desktop OS may be distinguished from a multi-user server OS or terminal services OS in various ways. A terminal services OS may be configured to provide or serve an application instead of a desktop. The application may execute on a server, or on a virtual machine hosting a server OS or terminal services OS. A terminal services OS may be configured or optimized to provide or serve a specific type of application. A terminal services OS may be configured or optimized for providing applications to multiple users, concurrently or otherwise. A terminal services OS may support sessions for multiple users. A terminal services OS may be configured to support a plurality of users at the same time, e.g., by serving an application to each user.

A desktop session, on the other hand, can provide a user access to a plurality of applications within a desktop. The desktop environment can include supporting features and configurations to support a wider variety of applications. A desktop session can support interactions between applications and files within the same desktop environment, and can therefore provide a richer, more complex and more interactive user experience. A desktop session may further provide the ability to remote access or remote control devices such as USB devices connected to a client device, or devices connected to a host device executing the desktop session. Terminal services may lack this and other abilities supported by a desktop OS platform.

In organizations that provide remote delivery of resources to users, information technology (IT) administration may wish to provide a variety of applications and computing environments to the users. IT administration may provide terminal services for supporting certain types of application, and may additionally maintain servers for supporting desktop sessions. The systems and methods discussed herein may enable a more homogeneous, economical and/or efficient way for administering and supporting a broad variety of applications to users. For example, these systems and methods may provide users with both desktops and dedicated applications using the same platform, i.e., desktop OS platform. These systems and methods may provide additional features that may be unavailable with terminal services, such as enabling hosted application to access client devices such as USB devices.

The methods and systems described herein provide support for delivering applications hosted on desktop operating systems. Some of these applications may not be supported by or compatible with a terminal server. Some terminal servers may not be able to support delivery of an application to certain client devices. As such, validation of such applications for deployment using terminal services may require significant effort. By using a more flexible, versatile and powerful desktop OS platform, IT administrators may be able to reduce their application validation effort.

In various embodiments, the methods and systems described herein may centrally configure one or more applications, and may deliver these applications from a pool of physical or virtual machines (VMs) executing a desktop OS or session. In some embodiments, the systems and methods described herein can be built using a remote desktop platform, e.g., XenDesktop. A delivery module may redirect data from a client device to an application that is hosted on a desktop OS. The delivery module may deliver or provide icons representing desktop-OS-hosted applications to a client device. The delivery module can monitor and control application sessions providing access to such applications, and may further support session-sharing, reconnection and smooth-roaming of desktop-OS-hosted applications. The delivery module can provide support for powering on VMs as needed to provide a requested application. In some embodiments, the delivery module can deliver applications hosted on a desktop session to a user, and further assign the desktop session to the user. Accordingly, the user can be routed to the same desktop session when the user requests for or launches another application session.

In some embodiments, an application session includes an executing instance of an installed application. An application session may include a delivery of the application from a host (e.g., a desktop operating system or server) of the application to a client device. An application session may include a connection between the host and the client device. In some embodiments, an application session includes activities and/or communications with the application, e.g., in connection with a user or another application. An application session may include a process of the application. An application session may describe or include an execution "lifetime" or duration of an application. In some embodiments, an application session refers to a user's duration of usage or access to an application. An application session may include or refer to interactions with a user or program while the application is running. In certain embodiments, an application session is a component of a desktop session. An application session may refer to a remote application launch and/or the subsequent monitoring, management and/or other activities of that application while executing. In some embodiments, an application may include one or more virtual channels between a desktop OS and the client device.

Figure 3A:
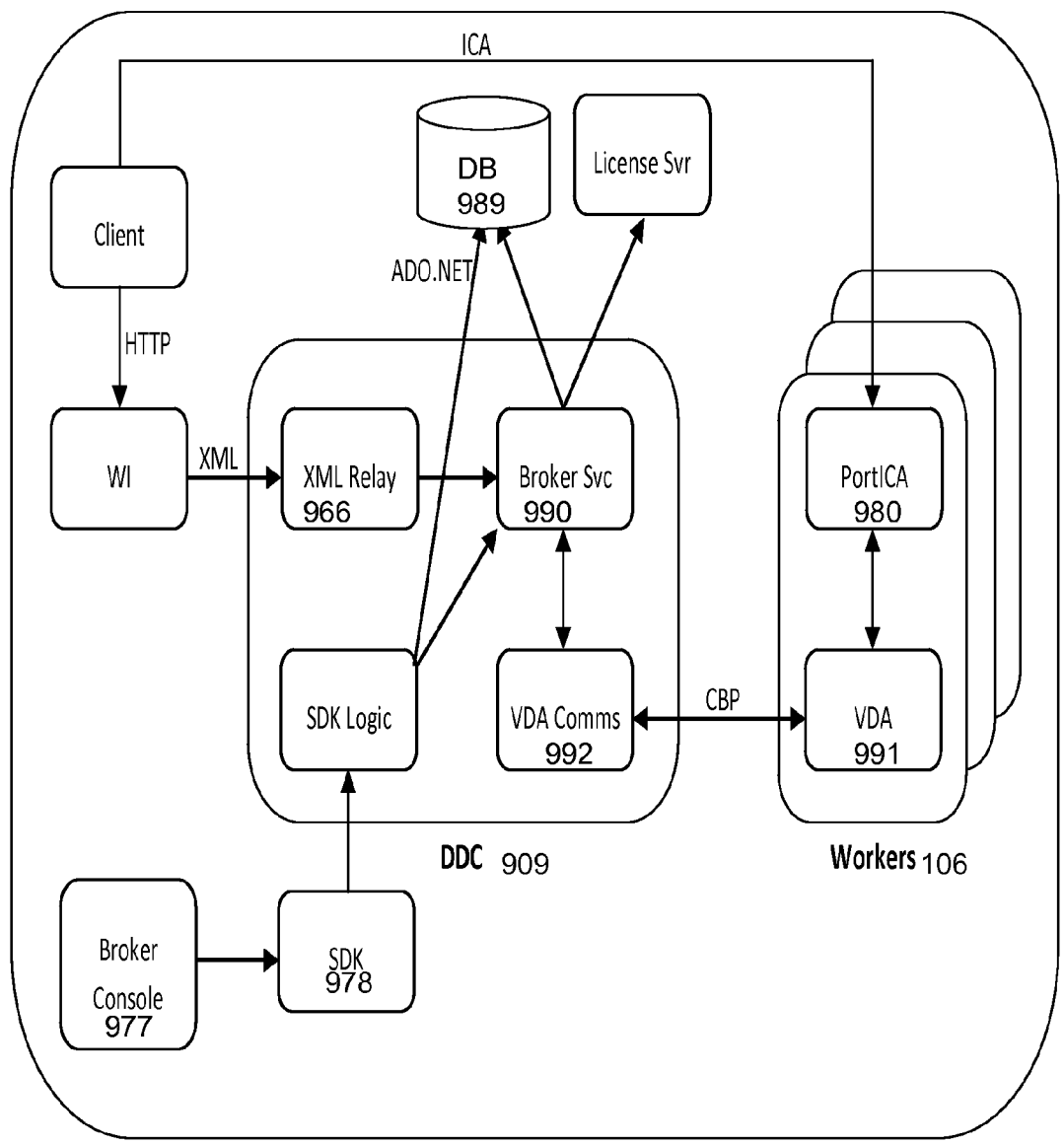
FIG. 3A is a block diagram illustrative of one embodiment of a system for delivering an application from a desktop operating system.

Illustrated in FIG. 3A is one embodiment of a system for delivering an application from a desktop operating system. In brief overview, the system may include a database component (DB) 989, a broker console 977, a broker service 990, an XML relay 966, and a PortICA module 980 on a worker machine 106. Various components of the system may incorporate features and functionality from components described above in connection with FIGS. 2A and 2B. In some embodiments, some components of this system may be adapted or modified from components described above in connection with FIGS. 2A and 2B.

Referring to FIG. 3A, and in more detail, the system may include a database 989 or DB component. The database 989 may comprise any type of memory or storage device, such as those described above in connection with FIGS. 1B and 1C. The database 989 may comprise one or more storage devices or databases residing on one or more computing devices. For example, the database 989 may incorporate features of a storage area network (SAN). In certain embodiments, database 989 may be maintained on virtual disk or memory within a virtualized environment, and mapped to physical storage locations. The DB component can be a relational database that is used for saving configuration data (e.g., desktop properties, farm administrators, access policies, etc). The DB component may be used to save or store a state of a computer or server farm (e.g., information about online workers, session data, application configuration, settings, user preferences, etc). The database 989 may also provide a number of stored procedures that implement business logic for the system. The database 989 may be accessed by desktop delivery controller (DDC) components using any variety of software modules for accessing data and data services, such as ADO-.NET. In some embodiments, the supported database type can be a Microsoft SQL Server (e.g., Express, Standard & Enterprise editions).

The system may include a broker console 977. In some embodiments, the broker console may be used for administration of the system or a portion of the system. The broker console 977 may provide a programming platform, such as a platform for creating, administering and hosting applications.

The broker console may incorporate a user interface for management and/or administration activities. The broker console may include custom or standard programming and/or user interface platforms, such as MICROSOFT management console (MMC) 3.0 features, configurations or snap-ins.

In some embodiments, the broker console 977 configures desktops served from machines executing desktop operating systems. The broker console may configure various types of policies, such as policies for desktop delivery, access and management. For example, these policies may be classified as policies for access, assignment, power-management, and delegated administration. In certain embodiments, the broker console provides a platform for session management. The broker console may be used for managing, monitoring and/or controlling sessions such as desktop sessions, application sessions and data delivery sessions.

The system may include a software development kit (SDK) module 978 and/or SDK logic, for interfacing the broker console with a delivery module 909. The broker console 977 may activate or invoke one or more application programming interfaces (API) provided by the SDK component to manage one or more servers 106 hosting a desktop OS (e.g., server farm). In some embodiments, the SDK components may implement a task automation framework which can include a command-line shell and associated scripting language. For example and in one embodiment, the SDK components may implement the MICROSOFT PowerShell SDK for configuring and managing the server farm.

The system may include a broker service 990. The broker service may be a component of the desktop delivery component (DDC). The desktop delivery component 909 is sometimes referred to as the delivery module. In some embodiments, the delivery module includes the DDC. By way of illustration, the broker service may provide functionality for performing any one or more of, but not limited to: (i) determining desktop sessions that a user has access to, (ii) locating or finding a suitable machine or server 106 for hosting a desktop session, supporting session reconnection and/or workspace control, (iii) authorizing desktop launch requests and checking out licenses on behalf of the worker machines, and (iv) pool management, i.e., starting/stopping VMs based on application need or usage.

In some embodiments, workspace control refers to features that allow a user to disconnect, reconnect or logoff their remote delivery sessions. For example, a user can reconnect to any disconnected or active sessions upon login through the DDC. The system may provide a user with the ability to reconnect the user to some or all of the user's active and/or disconnected application sessions. The system may provide a user with the ability to disconnect some or all active application sessions. The system may provide a user with the ability to logoff from some or all application sessions The system may include an XML relay 966. The XML relay may be a module, application or service installed on the DDC. The XML relay may parse XML or other request, from a Web Interface (WI) server for example. The XML relay may request the broker service to perform specific actions (e.g., enumerate desktops, launch desktop, etc) upon parsing the request. The XML relay may return the response from the broker service (e.g., in XML form) back to the Web Interface server.

The system may include a virtual desktop agent (VDA) 991 and/or a VDA communications component 992. The VDA 991 may be delivered to, installed, and/or execute on a worker machine 106 or server. The VDA communications component may reside and/or execute on the DDC. These two components may communicate using Connection Brokering Protocol (CBP), between themselves and/or with other components. The virtual desktop agent 991 and/or VDA communications component 992 may perform any one or more of the following functions, although not limited to: (i) performing worker registrations with the DDC, (ii) delivering configuration to worker machines 106, (iii) monitoring sessions on worker machines, (iv) preparing workers 106 to accept connections (e.g., ICA connections), and (v) authorizing launch requests, etc. In some embodiments, communications between the workers 106 and the DDC is channeled through the VDA and VDA communications components. The VDA may also provide APIs that may be used by PortICA 980 while establishing a presentation layer protocol (e.g., ICA or RDP) connection.

The system may include a PortICA module 980. PortICA may be any type or component or agent residing or installed on a worker server 106. PortICA may include any type or program, instructions, code, routine, applet or agent delivered to, installed on and/or executing on the worker server 106. PortICA may run on an operating system of the worker server 106, and may provide support for establishing a presentation layer protocol (e.g., ICA) connection between the server 106 and a client device.

The present system can support several types of desktop sessions. The term, DesktopKind, may be used to indicate the designated usage, kind or type of a desktop. The types of desktops supported may include:

Private desktop sessions, or PrivateDesktop: a desktop session that can be assigned to an end-user (e.g., permanently, or as a dedicated desktop session for the user). A desktop session of this type can be currently unassigned, but can be permanently assigned to an end-user.

Shared desktop session, or SharedDesktop: a desktop session, which may belong in a shared pool of desktop sessions. When a user logs off from such a desktop session, the desktop session may be returned back to the shared pool, and may be re-assigned to another user.

Shared application delivery desktop, or SharedAppDeliveryDesktop: this may be a shared desktop session that may be designated for delivering applications. In some embodiments, a shared application delivery desktop is not configured for, or is prevented from delivering desktops. A shared application delivery desktop may be configured or designated for delivering one or several types of applications.

Private application delivery desktop, or PrivateAppDeliveryDesktop: this may be created for ease of management, such as applying policies or implementing any business logic. This incorporates features of a private application and/or private desktop session described elsewhere in this disclosure.

Figure 3B:
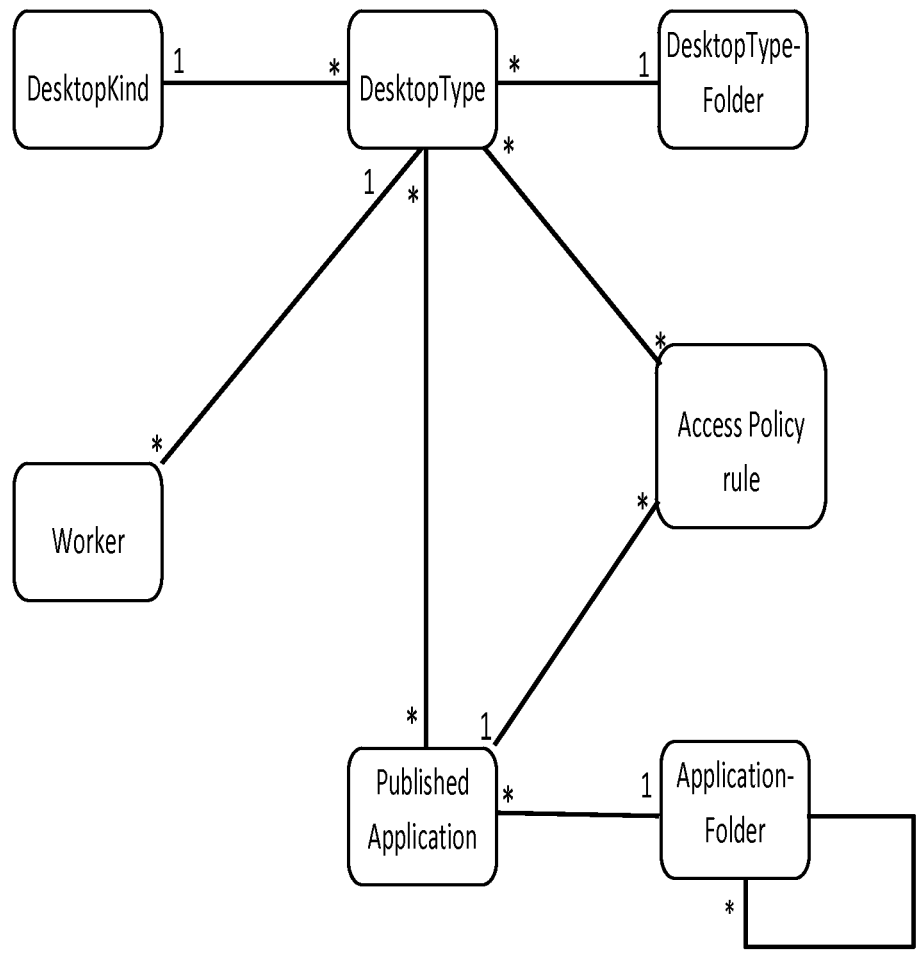
FIG. 3B is a block diagram illustrative of one embodiment of a relationship between object types defined to support a system for delivering an application from a desktop operating system.

The present system may group the plurality of worker servers 106 into one or more groups, such as according to the type of a machine and/or its specification. The term, Desktop Group, may be used to uniquely identify the type of a machine or the machine's specification. For example, a Desktop Group may be "Morgan S. Standard Vista MS Office machine", which may be mapped to one or more machines 106 with a specification (e.g., disk image) of MS Vista SP1, MS Office 2007, 2 virtual CPUs and 2 GB RAM. Machines or servers 106 of the same Desktop Group may be identical or similar, and may be collectively referred to by the Desktop Group name or identifier, such as for purposes of applying policies or associating with applications. Shared or shared application delivery desktop sessions, for example, can be grouped together (e.g., in the broker console) under a Desktop Group node. In some embodiments, the Desktop Group can include a private application desktop group, comprising private desktop sessions, as one of the Desktop Groups Illustrated in FIG. 3B is one embodiment of a block diagram depicting associations between some of the entities described herein. In some embodiments, a Desktop Group object can be of one DesktopKind. In other embodiments, a Desktop Group object can be of a plurality of DesktopKinds. Multiple Desktop Group objects can be of the same DesktopKind. Multiple Desktop Group objects can be in the same Desktop Group-Folder. A Worker machine 106 can be of a specific Desktop Group. Multiple Worker machines 106 can be of the same Desktop Group. A user can be associated with multiple Desktop Groups. Multiple users can be associated with the same Desktop Group. In some embodiments, a Published Application can be in one Application-Folder. Multiple Published Applications can be in the same Application-Folder. A Published Application can be associated with multiple Desktop Groups (e.g., for hosting). Multiple Published Applications can be associated with the same Desktop Group. A user can be associated with multiple Published Applications. Multiple users may be associated with the same Published Application.

In some embodiments, a delivery module, which may include the DDC, provides various functionality for enabling and/or supporting the provisioning of applications from desktop operating systems to client devices. The delivery module may include hardware and/or any combination of hardware and/or software. For example, the delivery module may include incorporate hardware from at least one appliance, server, or any computing device 100. The delivery module may include and/or execute software modules and processes, such as applications, programs, routines, scripts, instructions, on one or more processors (or cores). The delivery module may include and/or execute a hypervisor and/or allocate resources to at least one virtual machine. One such virtual machine may host a desktop OS and/or an application. In some embodiments, the delivery module includes the system described in FIG. 3A, or any portion thereof. For example, the delivery module may be a platform that includes the DDC in communication with at least one PortICA and VDA module residing or executing on a worker server 106.

In some embodiments, the delivery module may notify or otherwise provide an indication to a client device of the types and/or range of applications that is available or that a user can request. For example, the delivery module may provide or instruct a client device to list applications hosted by one or more desktop operating systems available to a particular user. The delivery module may publish or show availability of applications based on any OS platform, such as Windows XP, Vista or Windows 7 (client OS). The delivery module may display launched applications as part of session data available to the administrators for the system. End-users may be able to view their applications via a user interface, such as a Web Interface (WI). These user may use or install a plugin (for example when running stand-alone or in the context of Citrix Receiver) on a client device to access the interface. The delivery module may provide or enable session-sharing, reconnection to a disconnected application, and smooth roaming of a client device (e.g., Workspace Control, as discussed earlier).

In some embodiments, the delivery module may support client-to-server and/or server-to-client content redirection. For example, a client device may pass data, such as a file, to an application served from a remote desktop operating system for processing. The delivery module may parse, analyze and recognize such data or files, and may further match these to an appropriate application from an available range of applications. The methods used may include file type association (FTA). For example, the delivery module may recognize that a file having a filename with a ".doc" extension is a MS Word file, and may provide a MS Word application session to process the file. In some embodiments, for example, the delivery module may parse header or control data in a file and determine that the file requires Adobe Acrobat Reader.

In certain embodiments, a delivery module may receive a request for an application by way of a user action on the client device, e.g., clicking on a file icon to open the file. The delivery module may use FTA to determine the appropriate application to serve to the client device. In some embodiments, the delivery module may receive a description and/or a portion of the file or data, to determine which application to provide. The delivery module may have an agent or local module executing on the client device to determine an appropriate application (e.g., via FTA) to request.

An administrator may use a remote desktop application console for publishing applications and/or managing application sessions. This console may include the broker console, for example. In order to deliver applications to end-users, an administrator may create application objects that can be published to end-user devices. By way of illustration, and not intended to be limiting in any way, Table 1 lists tasks that may be available for managing published application objects.

TABLE 1

Tasks for managing published applications

| Task | Description |
|---|---|
| New | Create a new published application object by specifying settings like name, icon, path, hosting, access, etc. Other sections of the present disclosure provides examples of configurable application settings and their descriptions. |
| Edit | Modify one or more properties of an existing published application. |
| Rename | Change the Display name of a published application. |
| Delete | Delete one or more published applications. |
| Disable | Disable one or more published applications. A disabled application cannot be launched by an end-user. |
| Enumerate | Enumerate the published applications in the root "Applications" node or a sub-folder |
| Duplicate | Create a copy of a published application |

An administrator may, via the remote desktop application console for example, create application folders to organize objects in a hierarchical manner. Application folders can contain or list application sub-folders, as well as published applications. In some embodiments, a published application object can only be in a single folder. In other embodiments, a published application object can be assigned to or located in multiple folders, for example, corresponding to multiple functions of the respective application.

An administrator may specify one or more worker machines 106 available to host a published application. This is done by associating, via the remote desktop application console for example, a published application with one or more Desktop Group objects. Each Desktop Group object may be associated with zero, one or more worker machines 106 configured to support the application.

A user and/or client device may request access to an application. However, the delivery module may subject a request to access control. Access to applications can be configured, by an administrator or the delivery module, using one or more access policies. A policy engine may maintain, update and/or provide the one or more access policies. The policy engine may reside in a server, the delivery module, or any of the component described, and may be configured via the remote desktop application console. Access to published applications may be granted based on one or more of the following illustrative criteria: (i) User account/Group membership (must be specified in some embodiments), (ii) connection via an access gateway or not (optionally specified in certain embodiments), (iii) and if connecting is done via an access gateway, the set of advanced access control (AAC) conditions that has to be met (optionally specified in some embodiments). In some embodiments, AAC refers to multilevel access control, or systems and methods of access control that determines whether to grant one of a plurality of levels of access to a user or client device.

In some embodiments, FTA support may depend on the capabilities of a worker server 106 and/or a desktop OS hosted on the server 106. The methods and systems described herein can provide support for an administrator to import file type association information from a worker server 106. The delivery module may track, store and/or maintain the FTA information for a plurality of worker servers 106 and/or desktop OS. The delivery module may process a user request against FTA information, to determine an application to serve to the user. In some embodiments, an administrator and/or the delivery module can import or gain access to FTA information from a worker server 106 and/or a desktop OS using the following illustrative process:

An administrator may select a specific Desktop Group object for importing FTA information. The administrator may select a trusted worker server 106 of this Desktop Group that is online and registered with the DDC. The DDC may then request the worker server 106 to provide its FTA information. Upon receiving this information, the DDC may store this information in a database (residing in the DDC, for example), which can be used while publishing an application and/or identifying an application.

The methods and systems can provide support for the administrator to view/search sessions and control them (e.g., disconnect, logoff, send message). For example, the administrator may use the remote desktop application console to show published applications that have been launched in a desktop session. The present systems and methods may provide one or more administrative policies for configuring server farm administration. These policies can support a number of administrative roles, such as: (i) Full administrators: administrators that may have full permissions over some or all aspects of the broker service, (ii) Read-only administrators: administrators that may be able to view some or all information, including user sessions (in some embodiments, such administrators cannot make any changes), and Help-desk administrators: administrators that may be able to view configuration of some or all Desktop Groups of the AppDelivery kind, manage sessions on these, view configuration of some or all published applications, and/or manage application sessions.

The present methods and systems may provide support for configuring the number of idle desktop sessions (e.g., of the SharedDesktop kind) that should be available at different times, such as different times during a day (e.g., peak-hours, regular-hours and off-hours) and/or on specific days of the week. These idle desktop sessions may be grouped, configured and/or managed as a pool of desktops sessions or servers 106. An administrator may perform the configuration via the remote desktop application console, for example.

The delivery module may provide various end-user support in connection with the application provisioning. For example and in some embodiments, the delivery module may perform application enumeration. Application enumeration may be used to describe the process of determining published applications that a user is allowed to launch and/or returning data for these applications to the user. An end-user may, for example, view application icons of such applications (e.g., in a browser or in a Start menu). A Web Interface (WI) server of the system may provide and/or update application information to a corresponding client device, so that end-user can see a listing or representation of available applications. The list of allowed applications may be determined by the broker service, e.g., by evaluating one or more access policies and/or examining whether a published application is marked as enabled or not.

As part of application enumeration by the delivery module, file types associated with the enumerated applications may be updated in the registry of the client machine. By using such FTA information, a published application can be identified by the delivery module and launched when a document is being accessed or activated on the client machine.

In some embodiments, the delivery module may perform application resolution. Application resolution, in some contexts, describes a process of finding a suitable machine 106 from which a hosted application may be launched and/or served to a user. Application resolution may be part of a brokering process performed by the broker service or the DDC. In certain embodiments, the application resolution process starts when a user clicks on an application icon in the browser or a Start menu. By way of illustration, the process may involve one or more of the following steps:

The broker service 990 may evaluate an access policy to determine if the user is allowed to access the published application. The broker service may attempt to find a suitable machine 106 for the application. The broker service may check if the user has a disconnected session for this application. If one exists, broker service may return the address (e.g., IP or MAC address, or virtual machine address) of the machine on which this session exists. The broker machine may provide the address to a WI server for example, so that the user can reconnect to the disconnected session.

If no disconnected sessions exist for this application, the broker service may check if session sharing is possible. The broker service may check if there are any active sessions for this user. For each active session, the broker service may check if some or all of a plurality of conditions are met. For example, the broker service may check if the application to be launched is associated with the Desktop Group of the machine that has the active session. The broker service may check if the application's settings (e.g. color depth, encryption) do not conflict with the settings for the active session. In some embodiments, if both of the conditions are met, the broker service returns the address of the machine 106 providing the session. The broker service may transmit the address to the Web Interface server, so that the user can session-share.

In some embodiments, if session-sharing is not possible or fails, the broker service may identify, from Desktop Groups associated with the application, a free or unassigned machine 106 to provide the requested application. The broker service may notify or instruct the VDA module 991 on the identified machine 106 to accept or establish a connection (e.g., ICA connection) with the client device. The broker service may transmit the address of the identified server 106, e.g., to the Web Interface server, so that the user's client device can accept or establish an ICA connection with the identified machine 106.

In some embodiments, the broker service may transmit the address of the server 106 to the client device. In certain embodiments, the server 106 communicates with the client device to establish a connection for an application session. The WI server may, in some embodiments, request the broker service to provide a ticket for the requesting user. The WI server may incorporate this ticket and/or the address of the available worker machine 106, in a communication or file (e.g., an ICA file) directed to the client device. In some embodiments, a module at the worker server 106, such as PortICA 980, may receive the file or communication. Responsive to the receipt of the file or communication, the PortICA 980 may use information in the file or communication to launch an application and/or establish a connection with the client device.

The delivery module may transmit, install and/or execute an agent on the client device. This agent is in some embodiments referred to as an ICA client. The client device, e.g., via the ICA client, may connect to the PortICA component 980 on the worker machine 106 selected for launching the application. PortICA 980 may send a request to the VDA 991 to authorize the application launch request, and/or to provide application settings, configurations and/or preferences. The VDA, may process this request and/or forward the request to the broker service 990. The broker service may validate the ticket, check out a license (e.g., XenApp license), and/or return the user's credentials and/or the published application settings to the VDA. The VDA may pass some or a portion of this information to PortICA. PortICA may use some of this information to provide logon access for the user to connect to the machine 106, and start the application if it is not already executing. In some embodiments, the foregoing process describes a new application launch. In certain embodiments, some of these process steps may be used for session reconnection and/or session sharing.

In some embodiments, the delivery module provides a delayed launch feature. The delayed launch feature may provide feedback to a end-user (e.g., via a "spinner" widget, and/or a message displayed on the user's client device) that the desktop OS and/or application being accessed is being started or revived from an inactive state. This feedback may be meaningful in case the selected server 106 or virtual machine for the desktop OS was assigned to the user from a suspended or other inactive state.

In some embodiments, the delivery module provides support for mapping client-side devices (e.g., USB devices) within a desktop or application session. This can be configured using a Group Policy Object (GPO). The delivery module may detect devices connected to a client device, and may allow the desktop OS or the hosted application to access or interact with these devices. The user may, for example, instruct the application session to access data stored in a USB device of the client device. A user may launch a hosted application via FTA by activating a file stored in an external disk drive of the client device. In some embodiments, the delivery module enables a user to access and/or operate a device (e.g., an external drive) connected to the worker server 106.

The systems described herein may define and assign any number of properties in association with a hosted application. The desktop delivery system may, for example use such properties to identify, track and/or manage applications. By way of illustration, an embodiment of properties supported by the present system is listed in Table 2.

TABLE 2

Properties supported by the Delivery module

| Property Name | Property Description |
| --- | --- |
| Display name | Name of the application. Can be unique with an application folder in the console. |

TABLE 2-continued

Properties supported by the Delivery module

| Property Name | Property Description |
| --- | --- |
| Description | Description of the application |
| Browser name | Used internally by IMA and ICA to identify an application. Can be unique farm-wide. May be shown to the end-user as part of status-indicators (logon dialogs) during the application-launch. The Browser name can be a uniquely generated ID used internally. |
| Command line | The full path to the application executable. May contain environment variables. |
| Working directory | The working directory which may be used when this application is launched. |
| Icon | The icon that the administrator has selected for the application. |
| Shortcut presentation | A number of settings may be used here to control how the application is displayed to the client:<br>Client application folder<br>Add to client's Start menu?<br>Place under Programs folder?<br>Start menu folder<br>Add shortcut to the Client's desktop? |
| Content redirection | One or more file-type extensions can be associated with the published application. When an end-user launches local content (e.g., a .docx file), this published application may be launched to open the content. |
| CPU Priority Level | The priority-level that may be used when launching a process for this application. |
| Client audio | These settings may control whether audio is enabled for the application and whether it is a requirement:<br>Enable legacy audio for this application?<br>Is audio required for this application? |
| Encryption | The settings may include:<br>SecureICA encryption levels to be used when connecting to this application.<br>Is the specified SecureICA encryption level a minimum requirement? |
| Application appearance | The settings may include:<br>Session window size (e.g. 800 × 600, Full screen, percentage coverage over client desktop)<br>Color depth<br>Hide Application title bar<br>Maximize application at startup |
| Disabled | If set to true, the application is not visible to the end-user and, in some embodiments, cannot be launched. |
| Hosting machines | Specified as references to one or more Desktop Group entities of the AppDeliveryDesktop kind |
| Access Control | These settings can control access to applications based on:<br>User identity, group membership<br>Connecting via Access Gateway or not (optional)<br>If connecting via Access Gateway, the AAC conditions that need to be met (optional)<br>Client IP and name (optional) |
| Wait for printers to be created | Indicates whether the published application should be started after the printers have been auto-created in the session. |
| Custom properties | May be arbitrary customer-defined data in the form of name value pairs |
| Tags | One or more labels associated with the application. Can be used for searching, filtering and in future for associating policies with applications. |

The systems and methods described herein can associate and/or personalize application delivery with respect to specific users. For example, the delivery module may assign a particular hosted application to a specific user. Such an application may be referred to as a private application. In some embodiments, a private application is an application that is launched from a desktop designated for a specific user. In contrast, a shared application may be launched from a different desktop session even if the request comes from the same user. Thus, once a desktop session hosting a private application is assigned to a user, the desktop session may be used exclusively by the user. As such, the desktop session and the application may appear to be "private" or dedicated to that user. On the other hand, a desktop session for a shared application may be shared by multiple users. For example, a shared application (and its desktop session) may be assigned to different persons at different times.

The delivery module may use a private application to enhance user experience between application sessions. For example, the private application may store or retain configuration, settings and/or preferences from a previous or another application session of the same user. Thus, the user may have access to the same "look and feel" of the application across different application sessions. The user may be able to operate with better efficiency and/or familiarity when using the same application in a new application session. In some embodiments, the delivery module may limit the retention and/or propagation of configuration, settings and/or preferences to certain aspects. For example, customization of application menus may be limited, whereas user preferences may be saved from one session and restored in another session.

In some embodiments, the same desktop session or OS is assigned to provide the private application. By using the same desktop session or OS, a user may have access to a more uniform user experience across application sessions. A different OS (e.g., OS platform) providing the same application may distort certain elements, i.e., the look or feel, of the application. A different virtual machine and/or server 106 hosting the same application may allocate or accord different types and/or levels of resources to a hosted application, and therefore may not provide the same user experience for the same application.

Access to the same desktop session or OS may enable access to some of the retained configuration, settings and/or preferences described above. The desktop session may remain active over a significant period of time, e.g., across multiple user application sessions. Thus, the desktop session may maintain some of the configuration, settings and/or preferences for the application and/or the user across application sessions. The desktop session may maintain some of the configuration, settings and/or preferences for the application or the user when a particular application session is not longer active, e.g., terminated by the user, or crashed unexpectedly due to a system, data or application error. The desktop session may store session information from an application session, to be restored in another application session. In some embodiments, the desktop session may store configuration, settings and/or preferences when the desktop session enters a sleep, standby, hibernation, low-power or other inactive mode. The stored information can be restored when the desktop session becomes active again.

A virtual machine or server 106 hosting the desktop session may similarly maintain configuration, settings and/or preferences of a desktop session. The virtual machine or server 106 may restore these when the same desktop session is restarted, or another desktop session is started for the same user. Thus, in some embodiments, the virtual machine and server 106 is also privately assigned to a specific user. In some cases, however, a virtual machine or server 106 can be shared among users. For example, In some of these cases, only a desktop session and/or application is private to a specific user. In yet other embodiments, a desktop session may be shared between users. Certain configuration, settings and/or preferences of an application and/or desktop session specific to each user may be maintained and restored for the corresponding user.

In some embodiments, an application may want to write data to local areas, such as the local file system or the registry, which are not part of the user's profile. A private application may provide continuity and address this situation, e.g., by maintaining a mapping and access to such local areas. Some applications may rely on the computer name or MAC address to identify the end user. The delivery module may track and match a private application with the corresponding user. The delivery module may match a specific user with a server 106, virtual machine and/or desktop session hosting the private application. Support for private application may address administrative needs and simplify tasks. For example, administration related to areas such as security and hardware configuration, may require a convenient way to designate a specific desktop session or specific type(s) of desktop sessions to a user for a specific application.

The delivery module may publish applications from a desktop session that is reserved for a user. An administrator or the delivery module may identify a pool of desktop sessions that have not been reserved for any user, and reserve it to a user when the user first launches the application. The delivery module may incorporate an "assigned on first use" (AOFU) approach in its configuration and/or algorithm for identifying a desktop session to a user. In some embodiments, a user may not be aware of whether an application is being hosted in a shared/reserved environment. The user may, for example, be presented with an application icon which looks like a regular shared application icon. The delivery module may support any number of standard operations like reconnection and workspace control, for a shared application.

In certain embodiments, the delivery module may identify that an assigned desktop session associated with a private application can be shared with a different private application for the same user. In some embodiments, the delivery module may identify that an assigned desktop session associated with a private application, can be shared with a different private application for another user.

In some embodiments, an administrator may deliver multiple applications or application sessions from a single desktop session reserved for a user. These applications or application sessions can session-share when launched, assuming that required criteria are met. Thus, presentation level elements of these application threads, instances or sessions can be extracted or isolated from those of other components of the desktop session. The isolated presentation level elements can be delivered in a single connection or session (e.g., ICA connection or session) to the client device.

An overview of various application delivery operations may be useful before considering the data model for supporting these operations. One of the operations, application publication, can involve at least three entities: Application, User, and Desktop, such that an authorized user can launch the application on an underlying desktop session. In application enumeration, we consider application-user authorization, that is, the delivery module can return applications to which the user has access. In application resolution, in addition to application-user authorization, the delivery module searches for a specific desktop to launch the application for the specific user. This may be referred to as application-user-desktop assignment (or simply application assignment), and may be denoted by a triplet <application, user, desktop>. In some embodiments, application assignment may be temporary, dynamic, and/or non-fixed. For private applications, application assignment can be made permanent, static, and/or fixed.

One embodiment of the data model for supporting these operations may have the following characteristics:

- Any user of an application may use the application if the application is published onto the group.
- An application may be published onto multiple shared desktop groups and/or multiple private desktop groups. Multiple applications may be published on the same shared desktop groups or private desktop groups.

In some embodiments, desktops in shared desktop groups are not permanently assigned to any specific user or application. Desktops in private desktop groups may be assigned permanently to a specific user by administrators for pre-assigned private desktop users or by the broker service at runtime for assigned-on-first-use (AOFU) users. In the data model, pre-assigned users may be associated with private desktops, while the AOFU user list may be associated with desktop groups.

One user may be assigned at most one private desktop from each private desktop group. After an AOFU user is assigned to a private desktop from the desktop group, the user can effectively become a pre-assigned user.

The <application, user, Desktop> assignment may be done by the broker service at runtime. Administrators may not explicitly create such an assignment. Thus, in some embodiments, administrators cannot explicitly change or delete such an assignment.

Figure 3C:
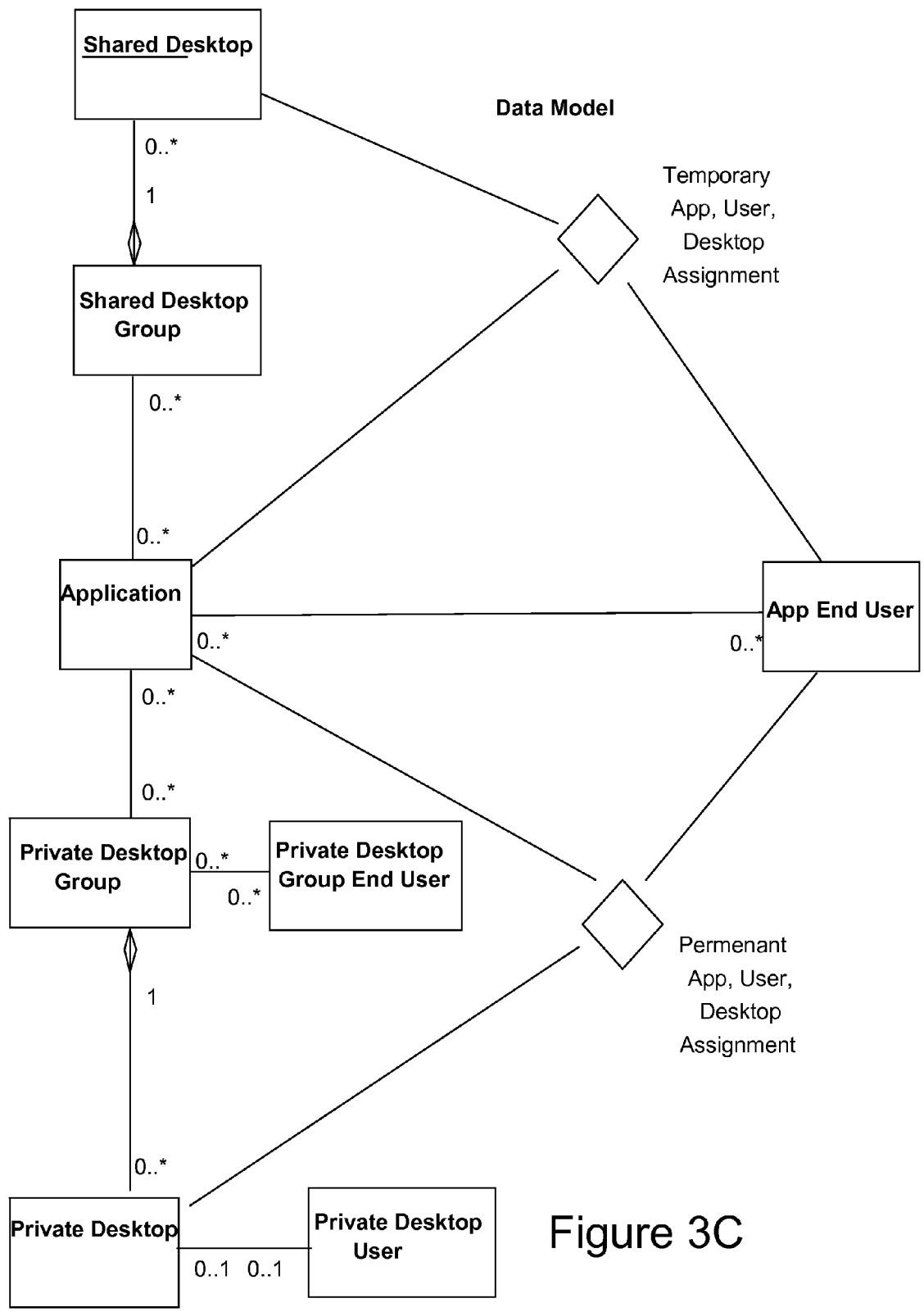
FIG. 3C-3F are block diagrams illustrative of various embodiments of a data model for supporting application provisioning from a desktop operating system to a computing device.

One embodiment of the data model is depicted FIG. 3C.

During application publishing, if a private desktop group is selected to publish the application and there is no user associated with this desktop group, and there is no desktop in the group assigned to any end user or there is no desktop in the desktop group, the application may be treated as if it is not published onto this desktop group. If an application has an empty application user list, or the application is not published onto any private desktop group or any shared desktop group, a warning may arise in the console. If an administrator chooses to accept such a configure for the application, the application may be disabled automatically. For a disabled application, if the "disabling" conditions are removed, the application may be enabled automatically. This check may be performed by the SDK 978, and SDK might not issue a warning in some embodiments. Operations that may be impacted can include:

Change Application & Application User association;
Change Application & Shared Desktop Group association;
Change Application & Private Desktop Group association;
Change <user, private desktop> assignment;
Change private desktop group & AOFU user association;
Change shared desktop group & desktop association; and
Change private desktop group & desktop association.

Figure 3D:
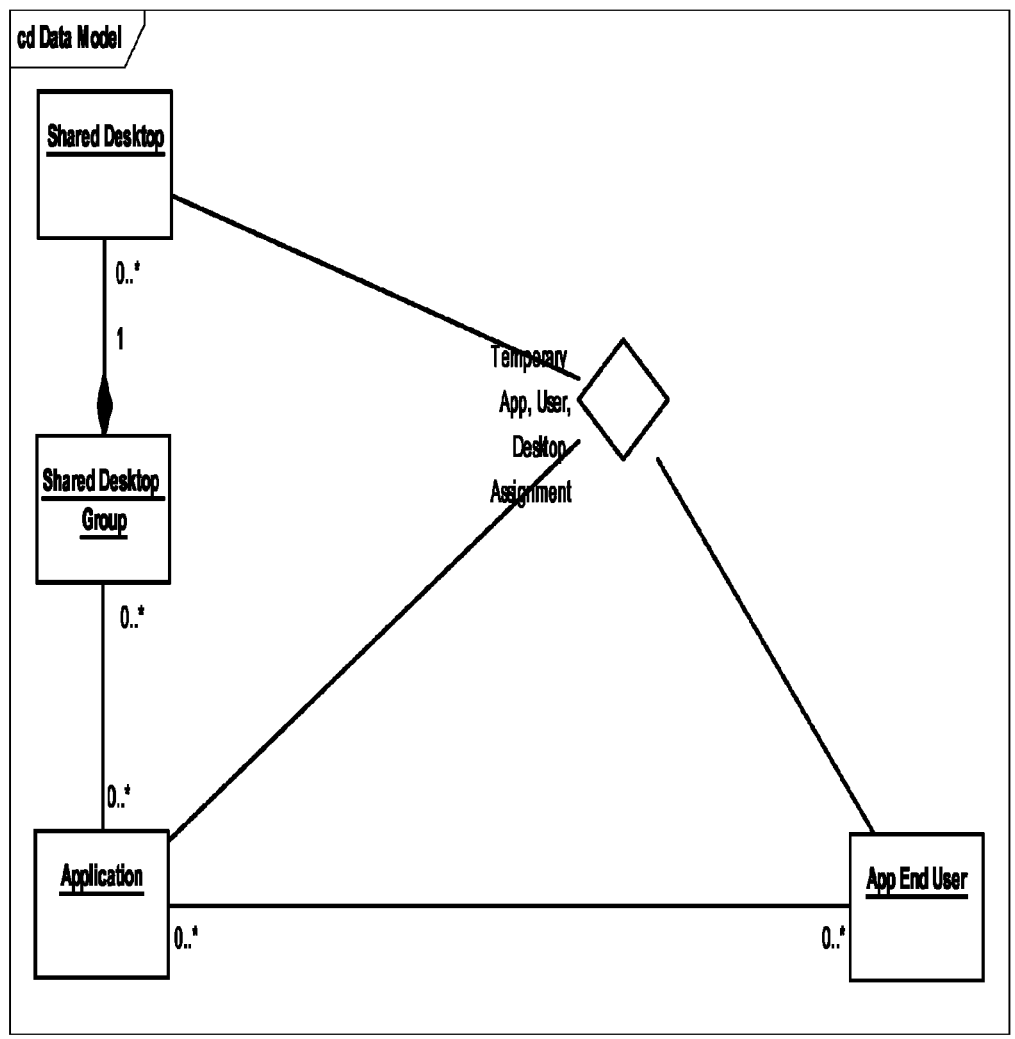

In some embodiments, the data model supports one or more types of configurations, including but not limited to:

(i) application published only to shared desktop groups. One embodiment of this data model configuration is depicted in FIG. 3D.

Figure 3E:
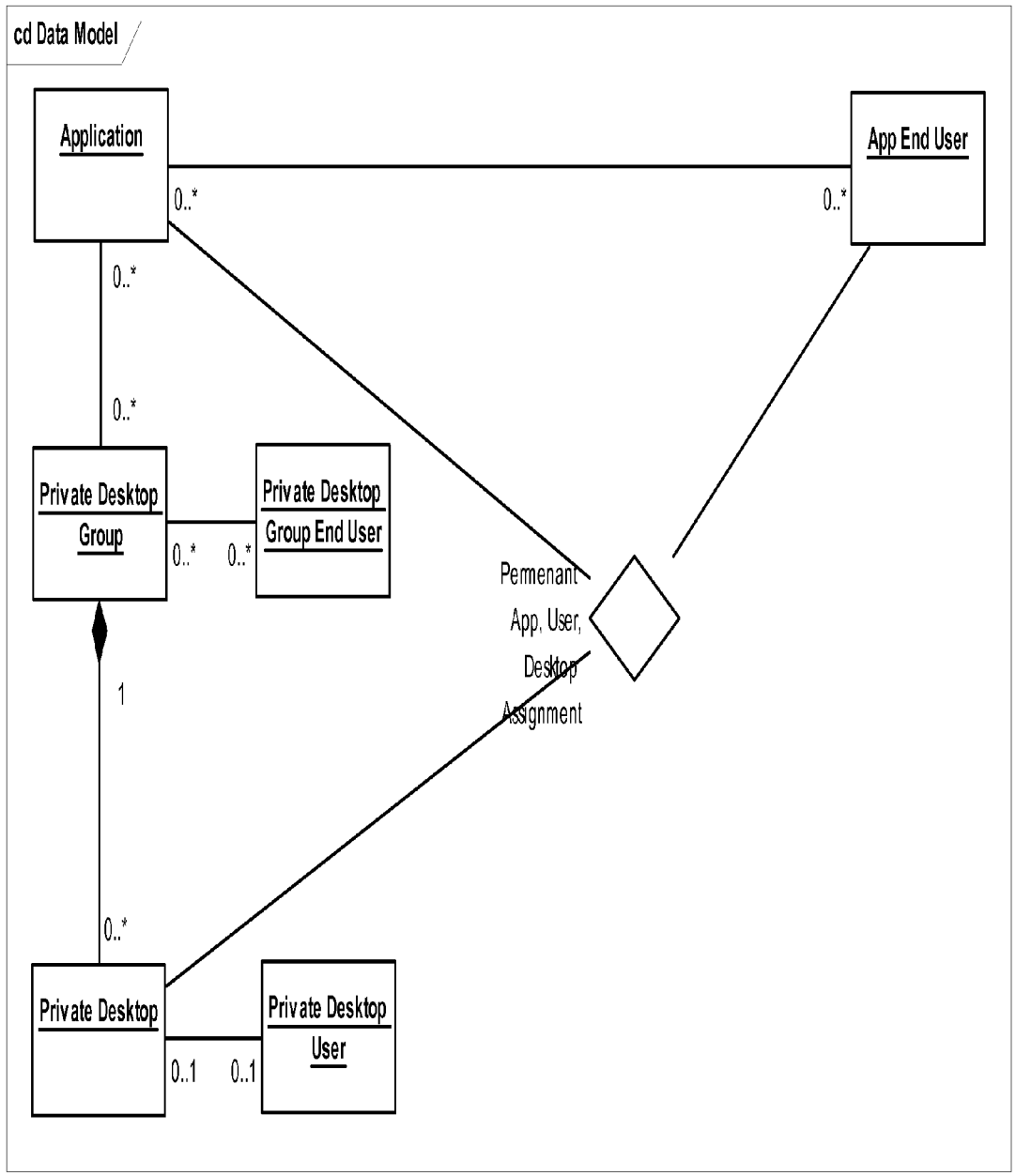

(ii) application published only to private desktop groups. One embodiment of this data model configuration is depicted in FIG. 3E.

Figure 3F:
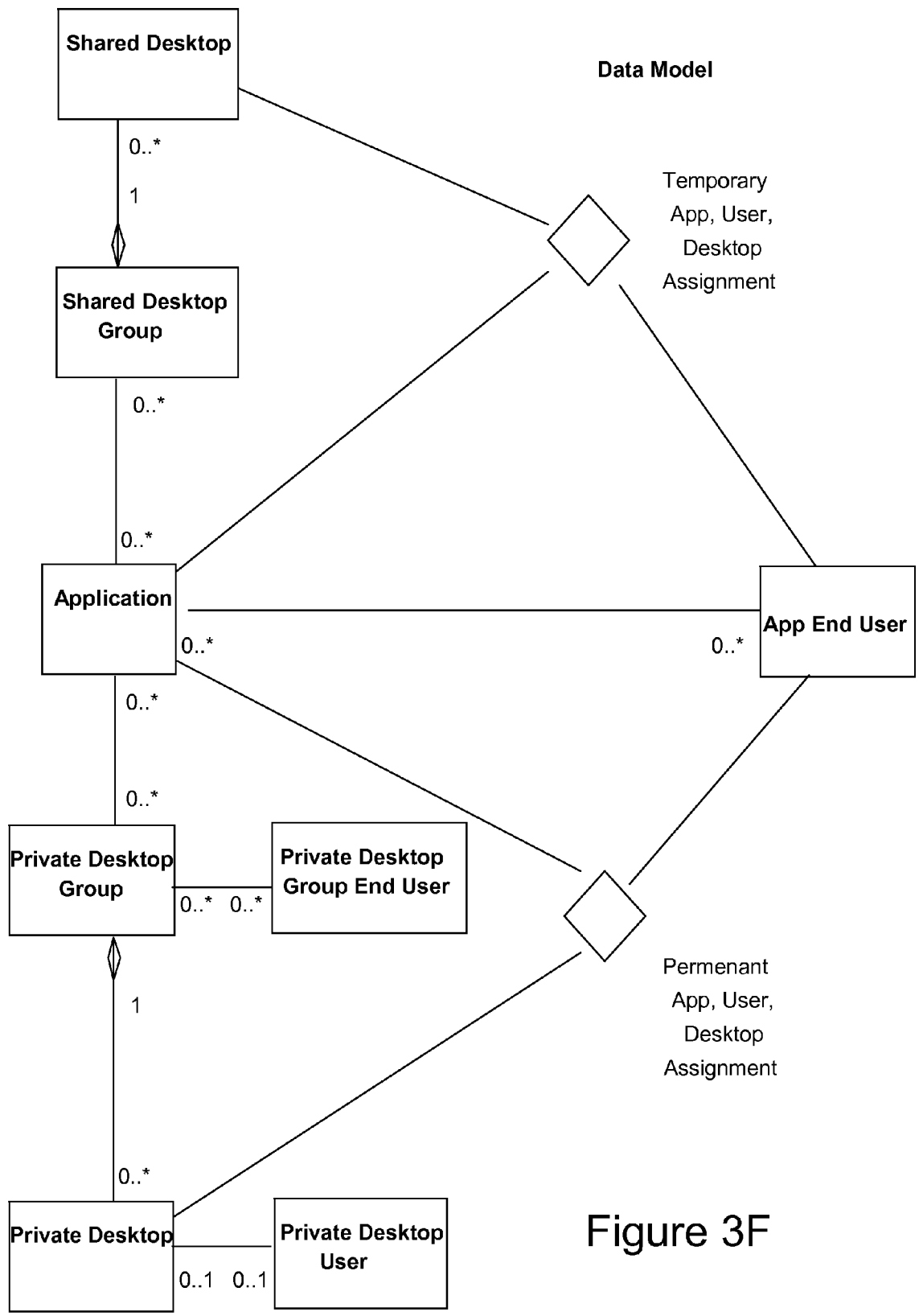

(iii) application published to both shared and private desktop groups. One embodiment of this data model configuration is depicted in FIG. 3F.

In some embodiments, according to the application and desktop group configuration, an application may be classified as a: (i) Private-Only Application, if it is published onto private desktop groups (the application may be launched as a private application); (ii) Shared-Only Application, if it is published onto shared desktop groups (the application may be launched as a shared application; or (iii) Private-First Application, if it is published onto both shared and private desktop groups (the application may be launched first as a Private-Only application; if failed, then be launched as a Shared-Only application). The classification or application usage may be inferred from the application's configuration of the underlying desktop groups. Administrators may not need to explicitly specify the application usage. The console may identify and indicate the classification of each application to an administrator.

In some embodiments, there may be at least two levels of authorization for an end-user: application authorization and desktop authorization. In one embodiment, an end user can launch an application only if she has access to the application and has access to at least one desktop session of an assigned desktop pool. If a user is in an application's user access list, the user can access the application and be indicated so during application enumeration.

For shared application desktops, the delivery module may specify that any application user has access to a shared application desktop session if and only if the application is published on the shared application desktop session. For private application desktop sessions, the delivery module may specify that only those AOFU users in the private desktop groups or pre-assigned users have access. An end user may be authorized through the user's domain and/or implicitly through one of the user's domain groups. If an application user is not a user of any private desktop groups of the application, the launch of the application for the user may fail and/or an error message may be sent to the client device.

In some embodiments, a private desktop session may be assigned to at most one user. One user may be assigned at most one private desktop session from each private application desktop group. Private desktop assignment may be done by administrators or by the broker service during the application launch. Once the assignment is done, the delivery module may not further distinguish the assignments. For a private desktop group, if a user is assigned a desktop session in the group, the user may be referred to as an "assigned desktop user" for this group, regardless of whether this assignment is by an administrator or by the broker service. Otherwise, if the user in the desktop session's user access list, the user may be referred to as an AOFU user for the desktop group. Otherwise, the user may have no access to the desktop group. Administrators may have the option to remove such a <user, desktop> assignment, in which all <application, user, desktop> assignment on this <user, desktop> pair may also be removed.

An Application-User-Desktop assignment may be simply referred to as an application assignment. For a private application, one specific desktop session may be assigned to one and only one authorized user. It may be considered private in the sense that the designated user may have exclusive access to the assigned desktop. The delivery module can publish multiple private applications onto the same private desktop session for the same user. One private application may be published onto at most one private desktop for the specific user. For a private application, application assignment may be done only by the broker service in certain embodiments. Administrators, in some embodiments, cannot explicitly create or delete such assignments. In one embodiment, the logic or process to assign a desktop session to a user for an application may include:

Case 1: no desktop is assigned to the user in all private desktop groups onto which the application is published. Therefore, randomly select a private desktop for this application;

Case 2: there are one or more desktops assigned to the users in one or more private desktop groups onto which the application is published. Therefore, randomly select an assigned desktop for this application.

If a private desktop group is removed from an application, all private application assignments on any desktop of the group may be removed automatically.

In some embodiments, it may be undesirable to publish all applications of a user onto the same private desktop session, because (i) the resources on a single desktop session may be (and usually) limited, (ii) some applications may not be able to run in the same desktop session due to incompatible session settings, such as color depth, and/or (iii) some applications may not work well concurrently on the same machine. Furthermore, an end user may decide to change session settings. In some embodiments, there are at least three session related settings in an application or desktop, (i) Color Depth, (ii) Audio Quality, and (iii) Encryption Level. In some embodiments, the delivery module may require that all private applications on the same desktop session should have the same session settings, which may be too restrictive in some of these cases.

In some embodiments, shared applications can be launched from a shared desktop session in the application's shared desktop pool. Application assignments for shared applications can be temporary and may be done dynamically during application launch, as for private applications. Such assignment may be implicit and random. In some embodiments, it is not persisted into the database. After the current user session terminates, the desktop session may be released into the shared desktop pool of the application.

In some embodiments, support for private application delivery is implemented in database tables maintained by the delivery module. As discussed, a desktop kind, Private Application Delivery, is supported which may, in some embodiments, impact the following table(s) (e.g., the check constraints on the following columns and related usage in stored procedures): (i) Chb_Config.Desktops.Usage, (ii) Chb_Config.DesktopGroups.DesktopKind; (iii) Chb_Config.ProvisioningSchemes.DesktopKind.

The delivery module may include a table for the <user, desktop, application> assignment, chb_Config.WorkerAccountApplicationAssignments, with the following columns:
 AccountUid, which is a foreign key to the chb_Config.Accounts table and such a user may be an end user, not a group user; However, it may not be required that the user is in the application's user list or the user lists of the application's desktop groups.
 WorkerUid, which is a foreign key to the chb_Config.Workers table; this worker may be in the application's private desktop pool.
 Application Uid, which is a foreign key to the chb_Config.Applications table;
 Key: <user uid, desktop uid, application uid>;
 Unique constraint on <user uid, application uid>: one private application for a user could be published onto at most one private desktop. This may be enforced by a unique index.
 Each private desktop is assigned to at most one user, which may be enforced by the broker runtime.
 Records in this table could be inserted or deleted by the broker runtime (not by admins), but could not be updated.

The delivery module may include a table for private application desktop group AOFU user list, chb_Config.PrivateAppDesktopGroupAccounts, with the following columns:
 DesktopGroupUid, which is a foreign key to chb_Config.DesktopGroups table;
 AccountUid, which is a foreign key to chb_Config.Accounts table; could be user sid or group sid;

Applications may be published via SDK commands (cmdlets), or through the management console which in turn runs through SDK cmdlets. The following cmdlets may be used for application management:

Cmdlets that supports the Private Application Delivery desktop kind:
 Get-BrokerPrivateAppDeliveryDesktop
 Set-BrokerPrivateAppDeliveryDesktop
 New-BrokerPrivateAppDeliveryDesktop
 Remove-BrokerPrivateAppDeliveryDesktop
 Add-BrokerApplication for the application & private desktop group association;
 Remove-BrokerApplication for application & private desktop group association;
 New-BrokerDesktopGroup
 Set-BrokerDesktopGroup
 Get-BrokerDesktopGroup Due to the inclusion of the chb_Config.WorkerAccountAppAssignments table, the following cmdlets may be included to query the <application, user, private desktop> associations:
 Get-BrokerUserDesktopAppAssignment;

Due to the inclusion of the chb_Config.PrivateAppDesktopGroupAccounts table, the following cmdlets may be configured to manage the Private Application Desktop Group & AOFU user association:
 Add-BrokerDesktopGroup
 Remove-BrokerDesktopGroup
 Add-BrokerUser;
 Remove-BrokerUser;

Application session settings related cmdlets:
 Get-BrokerSessionSharingIncompatibleApplication-Application $app_object, and Get-BrorkerSessionSharingIncompatibleApplication-AudioType <audioType>-ColorDepth <colorDepth>-Encryption <encryption>-SmartAccessTag[ ] <smart tags>-DesktopGroup[ ] <desktop groups>, which may return all applications which do not have the same session settings as the input application object or session settings Cmdlets for the following operations may automatically disable or enable an application:
 Change Application & Application User association;
 Change Application & Shared Desktop Group association;
 Change Application & Private Desktop Group association;
 Change <user, private desktop> assignment;
 Change private desktop group & AOFU user association;
 Change shared desktop group & desktop association;
 Change private desktop group & desktop association;

In some embodiments, application resolution may generally be described as:
 1) Perform a reconnection;
 2) If failed in step 1, do the application resolution as if the application is a private-only application;
 3) If failed in step 2, do the application resolution as if the application is a shared-only application.

For private-only applications, the following is one embodiment of the application resolution process in step (2):
 1. Session Sharing:
  Check the chb_Config.UserDesktopApps table to see if there is an application assignment for this user and this application.
  1.1) If the answer to the above check is yes, and if the desktop session is available, then select the desktop session to launch a new application session; otherwise, check only the existing application session which is running on the assigned desktop session for the <application, user> pair. If all other session sharing conditions are met, return this specific desktop session; otherwise, fail the resolution as a private-only application.

1.2) If the answer to the above check is no, for each application session in an appropriate state—active or in the process of becoming active, perform the following: If the underlying desktop session of the application session is in the application's assigned private desktop pool of the user, continue other session sharing match (such as WI settings). If session sharing succeeds, Create a new application assignment <application, user, desktop>, which essentially re-uses a desktop session that has been assigned to the user for this new application;

Return the specific desktop session;

If no application session is found to be shared, session sharing fails; continue to Step 2 below.

2. Search for a free desktop session:
  2.1) Pick, from the application's private desktop pool, one unused (no application session is running) desktop session already assigned to this user (by looking up in the <desktop, user> relation); desktop sessions published with the application have a higher priority to be selected.
  2.2) If failed in the above step, check those private desktop groups assigned to the application, and if the user is not yet assigned any desktop from that group, and if the user is an AOFU user in the group, try to find a free desktop session for the user. If failed, fail the resolution as a private-only application. Otherwise, assign the desktop session to the user:
     Create a <desktop, user> assignment and change the worker's usage.
  2.3) assign the application to the found desktop:
     Create a new application assignment <application, user, desktop>;
     Return the specific desktop session;

For Shared-Only applications, the following is one embodiment of the application resolution process of step (3):

1. Session Sharing:
   For each application session in an appropriate state—active or in the process of becoming active, perform the following: If the underlying desktop session is in the application's shared desktop pool, continue other session sharing match (such as WI settings). If session sharing succeeds, return the desktop session;
   If no application session is found to be shared, session sharing fails; continue to Step 2 below.

2. Search for a free desktop session:
   Select a free desktop session from the application's shared desktop pool and return the desktop session; otherwise—if no free desktop session in the application's shared desktop pool, fail the resolution as a share-only application, so that the application resolution fails as a whole.

Figure 3G:
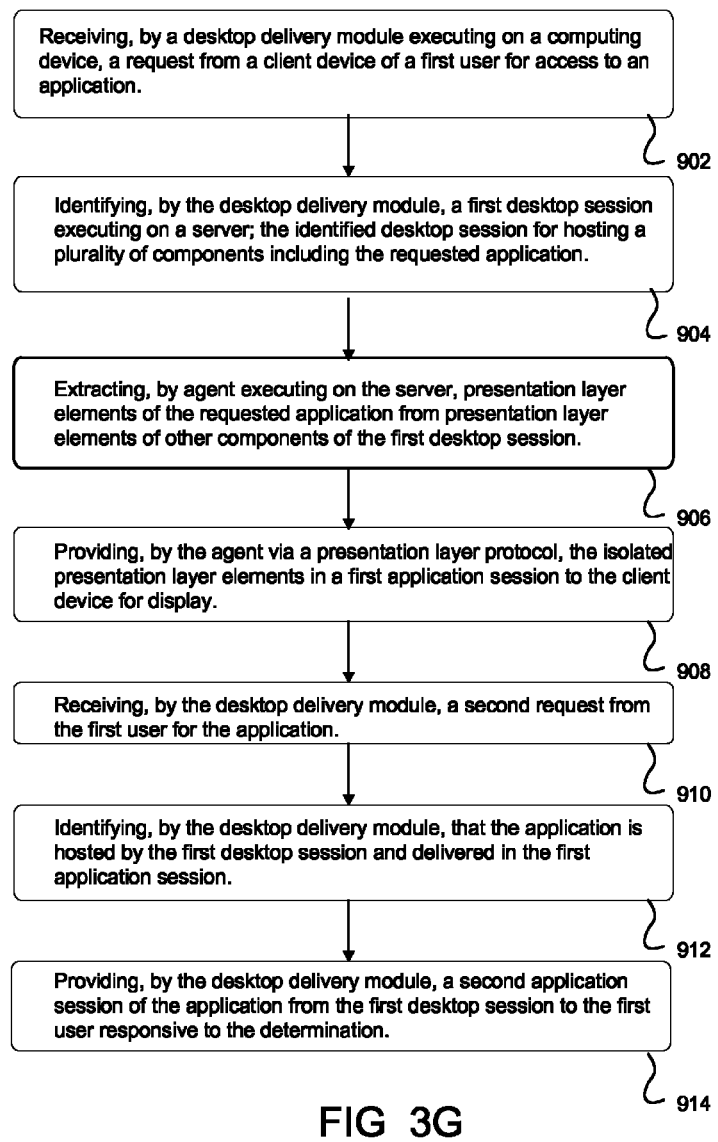
FIG. 3G is a flow diagram illustrative of an embodiment of a method for delivering an application from a desktop operating system.

Illustrated in FIG. 3G is one embodiment of a method for performing maintenance on computers in a load balanced environment. The various steps in FIG. 3G may incorporate any embodiment of the steps and features discussed above in connection with FIGS. 3A through 3F. A delivery module executing on a computing device may receive a request from a client device of a first user for access to an application (Step 902). The delivery module may identify a first desktop session executing on a server (Step 904). The identified desktop session may host a plurality of components including the requested application. An agent executing on the server may extract presentation layer elements of the requested application from presentation layer elements of other components of the first desktop session (Step 906). The agent may provide, via a presentation layer protocol, the isolated presentation layer elements in a first application session to the client device for display (Step 908). The delivery module may receive a second request from the first user for the application (Step 910). The delivery module may identify that the application is hosted by the first desktop session and delivered in the first application session (Step 912). The delivery module may provide a second application session of the application from the first desktop session to the first user responsive to the determination (Step 914).

Further referring to FIG. 3G, and in more detail, a delivery module executing on a computing device may receive a request from a client device of a first user for access to an application (Step 902). The delivery module may indicate, advertise, publish or otherwise present to the client device a plurality of applications available for request. The delivery module may monitor or poll a plurality of servers, appliances, application directories and/or virtual machines for applications available for request. The plurality of servers, appliances and/or virtual machines may host or execute a plurality of desktop sessions. The a plurality of desktop sessions may host one or more applications. The delivery module may monitor or poll a plurality of servers from one or more server groups, for applications available for request. The delivery module may determine that the one or more server groups are available or accessible to the user. In some embodiments, the delivery module may monitor or poll a plurality of desktop sessions for supported, hosted or available applications. The delivery module may publish to the client device these applications responsive to the monitoring or polling.

In some embodiments, the delivery module may receive a request for a particular application or type of application. For example, a user or program may request for a certain published application. A user may click on an icon or representation of the application presented or published via the user's client device. A user may click on an icon, link or representation of a published application presented via a web interface. The delivery module may identify a plurality of servers 106 providing the requested application or type of application. In some embodiments, the delivery module may, via a broker service, identify a plurality of servers 106, such as terminal servers, hosting the requested application. In some embodiments, the broker service may determine that the requested application, or the particular configuration of the application, is not supported by any of the terminal servers.

The delivery module may identify, from the request, the application based on file type association (FTA). The delivery module may identify the application in connection with a file residing on the client device. In some embodiments, a user may attempt to access or open the file via the client device. The client device may generate a request to the delivery module to identify an application for opening or processing the file. The request may include information about the file and/or a portion of the file. In some embodiments, the delivery module, or an agent of the delivery module executing on the client device, may determine a suitable application via FTA with the file. The delivery module may access FTA information stored in a database, the FTA information collected or received from a plurality of desktop sessions. Based on the FTA, the broker service may identify one or more desktop sessions hosting the appropriate application. The delivery module may determine that one or more desktop sessions from a plurality of desktop sessions can provide the appropriate application.

In some embodiments, the delivery module may identify a first desktop session executing on a server (Step 904). The delivery module may select the first desktop session from a plurality of desktop sessions designated for delivering applications to a user. The plurality of desktop sessions may be designated for delivering applications to a user instead of delivering a desktop. The delivery module may select the first desktop session from desktop sessions of the type "application delivery desktop session". In certain embodiments, the delivery module may select a private or shared desktop session. The delivery module may identify the desktop session based in part on the FTA information. The delivery module may identify the desktop session as belonging to a desktop session group associated with or assigned to the user. The identified desktop session may host a plurality of components including the requested application. The delivery module may identify a desktop session previously assigned to the user. The delivery module may identify a desktop session that previously provided an application session or delivered an application to the user.

The delivery module may select a desktop session that can host the requested application. For example, the desktop session may execute on a computing device that has an installation of the requested application. The delivery module may select a desktop session hosting or executing the requested application. The delivery module may select a desktop session having access to the requested application or already executing the requested application.

The delivery module may identify a desktop session having an application session (of the requested application, or a different application) with the user or client device. In certain embodiments, the delivery module may identify a desktop session having an application session disconnected from the user. The delivery module may identify a desktop session having an application session that can reconnect with the user to deliver the requested application. The delivery module may identify a desktop session having an application session that can session-share with a new application session for the requested application. The delivery module may identify a desktop session having or maintaining configuration data, settings and/or preferences specific to the user.

In some embodiments, the delivery module may assign the first desktop session as a desktop session dedicated to the first user. The delivery module may remove the desktop session from a pool of free or unassigned desktop sessions. The delivery module may update the assignment to a directory, table or database. In certain embodiments, the delivery module may select a desktop session for providing a private application. The delivery module may select a desktop session configured or installed with a private application. In other embodiments, the delivery module may select a desktop session that can deliver a shared application. The delivery module may select a desktop session for hosting or executing a private application. The delivery module may bring the selected desktop session from an inactive state to an active state, responsive to the selection. In some embodiments, the delivery module may launch or execute the requested application responsive to the request or the selected desktop session.

An agent executing on the server may extract presentation layer elements of the requested application from presentation layer elements of other components of the first desktop session (Step 906). The delivery module may indicate to an agent executing on the server to deliver the application, rather than a desktop, to the client device. The agent may comprise the PortICA and/or the VDA components residing on the server 106. In some embodiments, the agent may be hosted on a virtual machine providing the desktop session and/or the requested application. The agent may isolate, intercept and/or extract presentation elements of the request application from the presentation elements of the rest of the desktop session. For example, the PortICA component may partition or separate an ICA stream generated by the desktop session into various components, including components corresponding to the requested application. These components may, for example, include graphical elements, audio elements, administrative instructions or communications, z-order information, user interface function calls and communication.

The agent may intercept, extract or filter GDI calls, function calls, systems calls, interrupts or any other communications associated with rendering output from the application and/or interacting with the application. In some embodiments, the agent comprises a display driver. In some embodiments, the agent instructs a display driver to isolate, intercept and/or extract presentation elements of the request application. The agent or display driver may, for example, intercept function calls that instructs a GPU or other graphics device to render or draw graphical objects such as boxes and windows for the application. The agent or display driver may intercept function calls that creates widgets and objects like menus and buttons for the requested application. In some embodiments, a control application or control virtual machine hosted by a hypervisor on the server 106 may perform the interception or filtering on behalf of the agent. These communications, components and/or presentation level elements of the requested application may be generally referred to as extracted elements or extracted presentation level elements.

In some embodiments, the agent comprises one or more monitors, each of which may be a process, program or driver executing on the desktop OS or server. One or more monitors may be assigned to monitor certain aspects of the application, e.g., various presentation elements of the application. Some other monitors may be assigned to monitor other components or aspects of the desktop that may not pertain to the requested application. In some embodiments, a monitor (sometimes referred to as an application monitor) executes as a routine or component of the application. A monitor may also execute independently of the application, but identifies, e.g., via a process identifier of the application, function calls or messages that define the graphical presentation of the application. The monitor may intercept or identify messages or presentation layer elements specific to the application.

In some embodiments, the server or agent may receive, from the delivery module, data or a file (e.g., ICA file) for supporting or establishing a connection or application session with the client device. The delivery module may send an address of the server, or otherwise identify the server to the client device. The delivery module may authenticate the user and/or provide access control to the desktop session. Responsive to the identification and/or the received data or a file, the agent and/or the client device may establish a connection (e.g., ICA connection) and/or an application session with each other.

The agent may provide, via a presentation layer protocol, the isolated presentation layer elements in a first application session to the client device for display or presentation (Step 908). The agent may process the extracted elements using a presentation layer protocol such as ICA or RDP. The agent may deliver the extracted elements in a presentation level protocol. The agent may deliver the extracted elements in an application session to the client device. Other elements from the desktop session, such as presentation layer elements relating to other applications, widgets, components or OS features of the desktop, may be filtered, discarded or ignored. These elements can be prevented from being delivered to the client device.

The agent may deliver the extracted or isolated elements of the requested application to a delivery agent (e.g., ICA client) residing on the client device. The delivery agent may communicate with a graphical processing unit (GPU) to render the application output or extracted elements on a display of the client device. The delivery agent may convey the extracted elements to an OS of the client device and/or communicate with the OS to support interactions with the application. The delivery agent may further intercept user actions (e.g., mouse click or mouse over) directed to the application, and redirect these to the desktop session for handling. For example, the delivery agent may intercept, translate and/or redirect interrupts, system calls, function calls or other communications corresponding to or resulting from a user action. Accordingly, a user can access the requested application and interact with the requested application delivered from the remote desktop session.

In some embodiments, the delivery module, agent, VDA and/or PortICA establishes or provides one or more channels between the desktop OS and the client device. These channels may include virtual channels. Virtual channels can be created by virtualizing one or more "physical" channels, each virtualized into one or more virtual channels. For example, several virtual channels may be identified separately and can carry different types of communications, but may share the same port corresponding to a physical channel. The use of virtual channels can allow sharing or data multiplexing on a single non-virtual channel to support multiple streams of information.

One or more channels, such as virtual channels, may operate to communicate presentation layer elements from the server to the client device. Some of these channels may communicate commands, function calls or other messages from the client device to the desktop OS. These messages may be used to control, update or manage the operation and display of the application.

For example and in some embodiments, a first (e.g., Seamless Windows Interface (TWI)) virtual channel may work in conjunction with a second (e.g., Thinwire) virtual channel to deliver the application to the client device. Some of the virtual channels may be created in conjunction with one or more session monitors (e.g., ICA Session monitors) on the server. The session monitors may be mapped to, or communicate with, one or more application monitors executing on the desktop OS. In some embodiments, corresponding session monitors and application monitors may operate as combined entities, or interoperate as part of another module (e.g., PortICA).

Information (e.g., state and execution information of a monitor, extracted presentation level elements) can be transmitted from the server to the client device, via one or more virtual channels, to maintain an image of each of the session monitors on the client device. The image may be a communication agent or counterpart agent of a session monitor. The image may be created for receiving, updating, synchronizing and/or maintaining the transmitted information. The monitor images can be stored on the client device in a local video buffer (LVB) or other storage location. As windows and graphical elements of the application are created, changed, or destroyed on the server, a component of the delivery module or PortICA may send commands to the client device that includes graphical coordinate characteristic information (e.g., presentation level elements). These commands may be transmitted via the one or more channels (e.g., the Seamless virtual channel). The client device can receive these information, via the one or more channels, to create, update or recreate the application's graphical elements on the client device. The client device may also process or use the monitor images in the LVB, maintained or updated by one or more of the channels (e.g., Thinwire virtual channel), to create, update or recreate the application's graphical elements on the client device.

The delivery module may receive a second request from the first user for the application (Step 910). The delivery module may receive a second request via any of the means and methods described above in connection with step 902. The delivery module may receive a second request subsequent to or concurrently with the first request. The delivery module may determine the identity of the requesting user. The delivery module may determine which application is requested in the second request. The delivery module may determine whether the requested application is a private or shared application.

The delivery module may identify or recognize that the application is hosted by the first desktop session and delivered in the first application session (Step 912). The delivery module may determine if the user has previously accessed the same application requested in the second request. The delivery module may determine which desktop session, virtual machine and/or server provided access to the same application. The delivery module may identify that the application is hosted by the first desktop session and/or delivered in the first application session. The delivery module may identify if the desktop session is private or shared. In certain embodiments, the delivery module may determine if the desktop session is active or inactive. The delivery module may determine if the first application session is active, terminated or disconnected. The delivery module may determine if the first desktop session is still active or terminated.

The delivery module may provide a second application session of the application from the first desktop session to the first user responsive to the determination (Step 914). Responsive to the determination, the delivery module may attempt to reconnect with an disconnected application session. In some embodiments, the delivery module provides the second application session of the application to the first user responsive to a determination that the first application session is disconnected from the user. The second application session may comprise the first application session reconnected with the user. The delivery module may identify a disconnected application session for reconnection. The delivery module may perform reconnection to an application session of the same user. Upon reconnection, the previously disconnected application session may be resumed or restored. In some embodiments, a reconnected application session resumes execution from the application's last state prior to disconnection. In certain embodiments, an application may execute while its session is disconnected from a user or client device, and may continue execution when the application session is reconnected. In other embodiments, a new execution of the application is initiated when the session reconnects. When initiated, the application may use some settings or state information from the disconnected session.

The delivery module may provide the second application session of the application to the first user responsive to a determination that the first application session remains active. The delivery module may provide a new application session separate from the first application session. Both the new (second) application session and the first application session may belong to the same desktop session or desktop environment. Each application session may correspond to an executing instance of the application. The delivery module may provide session-sharing between the first and second application sessions. The second application session may be delivered via a same presentation layer connection as the first application session.

In some embodiments, the desktop session or the delivery module may determine if any configuration data, settings, update or preferences of the user has been stored from a previous or active application session. The desktop session or the delivery module may determine if any configuration data, settings, or preferences of the user from the first application session can be retrieved for the desktop session and/or application. The desktop session or the delivery module may determine if the configuration data, settings, or preferences of the user can be applied, or is already applied, to the second application session. For example, the delivery module may provide the second application session of the application, wherein the second application session incorporates an application update introduced in the first application session.

In some embodiments, the delivery module receives a third request from the first user for a second application. The delivery module may provide a third application session corresponding to the second application, e.g., from the first desktop session to the first user. The delivery module may determine whether the second application is a private or shared application. The delivery module may determine whether the second application is hosted by the first desktop session. The delivery module may determine whether the second application can session-share with the first application for delivery to the client device. In some cases, the delivery module may determine that the second application is hosted by the first desktop session and can session-share with the first application. The delivery module may isolate elements corresponding to the first and second applications for delivery to the client device in a single connection and/or shared session.

In other cases, the delivery module may determine that the second application is hosted by the first desktop session, but cannot session-share with the first application. In some of these cases, the delivery module may deliver the second application to the client device in a third or separate application session. In another embodiment, the delivery module may identify a third desktop session for delivering the second application to the client device. The delivery module may provide a third application session from a second desktop session to the first user, wherein the third application session corresponds to the second application.

It should be understood that the systems described above may provide multiple ones of any or each of those components and these components may be provided on either a standalone machine or, in some embodiments, on multiple machines in a distributed system. The systems and methods described above may be implemented as a method, apparatus or article of manufacture using programming and/or engineering techniques to produce software, firmware, hardware, or any combination thereof. In addition, the systems and methods described above may be provided as one or more computer-readable programs embodied on or in one or more articles of manufacture. The term "article of manufacture" as used herein is intended to encompass code or logic accessible from and embedded in one or more computer-readable devices, firmware, programmable logic, memory devices (e.g., EEPROMs, ROMs, PROMs, RAMs, SRAMs, etc.), hardware (e.g., integrated circuit chip, Field Programmable Gate Array (FPGA), Application Specific Integrated Circuit (ASIC), etc.), electronic devices, a computer readable non-volatile storage unit (e.g., CD-ROM, floppy disk, hard disk drive, etc.). The article of manufacture may be accessible from a file server providing access to the computer-readable programs via a network transmission line, wireless transmission media, signals propagating through space, radio waves, infrared signals, etc. The article of manufacture may be a flash memory card or a magnetic tape. The article of manufacture includes hardware logic as well as software or programmable code embedded in a computer readable medium that is executed by a processor. In general, the computer-readable programs may be implemented in any programming language, such as LISP, PERL, C, C++, C#, PROLOG, or in any byte code language such as JAVA. The software programs may be stored on or in one or more articles of manufacture as object code.

Having described certain embodiments of methods and systems for delivering an application from a desktop operating system, it will now become apparent to one of skill in the art that other embodiments incorporating the concepts of the invention may be used.

What is claimed:

1. A method for delivering an application to a computing device, the application delivered from a desktop session hosting at least one application and executing on a server, comprising:
   (a) receiving, by a delivery module executing on the computing device, a first request from a client device of a first user for access to an application;
   (b) identifying, by the delivery module, a first desktop session executing on the server for hosting a plurality of components including the requested application;
   (c) isolating, by an agent executing on the server, components corresponding to the requested application from the plurality of components;
   (d) extracting, by the agent executing on the server, the isolated components corresponding to the requested application from presentation layer elements of other components of the first desktop session;
   (e) generating responsive to the first request, by the agent via a presentation layer protocol, a first application session using the isolated components corresponding to the requested application, the first application session delivered to the client device for display, wherein the other components of the first desktop session are prevented from being delivered to the client device;
   (f) receiving, by the delivery module, a second request from the first user for the application, wherein the second request is different from the first request;
   (g) determining, by the delivery module, that the application is hosted by the first desktop session and delivered in the first application session; and
   (h) providing, by the delivery module, based on the determination and responsive to the second request, a second application session of the application from the first desktop session to the first user responsive to a determination that the first application session is disconnected from the first user, the second application session comprising the first application session reconnected with the first user.

2. The method of claim 1, further comprising indicating, by the delivery module to the client device, a plurality of applications available for request and hosted by a plurality of desktop sessions.

3. The method of claim 1, wherein (a) comprises identifying, from the request, the application based on file type association (FTA) with a file residing on the client device.

4. The method of claim 1, wherein (b) comprises selecting the first desktop session, the first desktop session designated for delivering applications to a user instead of delivering a desktop.

5. The method of claim 1, wherein (b) comprises assigning the first desktop session as a desktop session dedicated to the first user.

6. The method of claim 1, comprising providing a third application session of the application to the first user responsive to a determination that the second application session remains active, the third application session delivered via a same presentation layer connection as the second application session.

7. The method of claim 1, wherein (h) comprises providing the second application session of the application, the second application session incorporating an update to the first application introduced in the first application session.

8. The method of claim 1, further comprising receiving a third request from the first user for a second application, and providing a third application session from the first desktop session to the first user, the third application session corresponding to the second application.

9. The method of claim 1, further comprising receiving a third request from the first user for a second application, and providing a third application session from a second desktop session to the first user, the third application session corresponding to the second application.

10. A system for delivering an application to a computing device, the application delivered from a desktop session hosting at least one application and executing on a server, the system comprising:
a delivery module executing on a hardware processor of the computing device, the delivery module receiving a first request from a client device of a first user for access to an application, and identifying a first desktop session for hosting the requested application, the desktop session executing on the server and hosting a plurality of components; and
an agent executing on a processor of the server, wherein the agent isolates components corresponding to the requested application from the plurality of components; extracts the isolated components corresponding to the requested application from presentation layer elements of other components of the first desktop session, and generates responsive to the first request, via a presentation layer protocol, a first application session using the isolated components corresponding to the requested application, the first application session delivered to the client device for display, wherein the other components of the first desktop session are prevented from being delivered to the client device,
wherein the delivery module receives a second request from the first user for the application, wherein the second request is different from the first request; determines that the application is hosted by the first desktop session and delivered in the first application session, and provides a second application session of the application from the first desktop session to the first user based on the determination and responsive to the second request, and wherein the delivery module provides the second application session of the application to the first user responsive to a determination that the first application session is disconnected from the first user, the second application session comprising the first application session reconnected with the first user.

11. The system of claim 10, wherein the delivery module indicates to the client device, a plurality of applications available for request and hosted by a plurality of desktop sessions.

12. The system of claim 10, wherein the delivery module identifies the application based on file type association (FTA) with a file residing on the client device, the file identified in the request.

13. The system of claim 10, wherein the delivery module selects the first desktop session, the first desktop session designated for delivering applications to a user instead of delivering a desktop.

14. The system of claim 10, wherein the delivery module assigns the first desktop session as a dedicated desktop session for first user.

15. The system of claim 10, wherein the delivery module provides a third application session of the application to the first user responsive to a determination that the second application session remains active, the third application session delivered via a same presentation layer connection as the second application session.

16. The system of claim 10, wherein the second application session incorporates an application update introduced in the first application session.

17. The system of claim 10, wherein the delivery module receives a third request from the first user for a second application, and provides a third application session from the first desktop session to the first user, the third application session corresponding to the second application.

18. The system of claim 10, wherein the delivery module receives a third request from the first user for a second application, and provides a third application session from a second desktop session to the first user, the third application session corresponding to the second application.

* * * * *